(12) United States Patent
Neumeier et al.

(10) Patent No.: US 11,451,877 B2
(45) Date of Patent: *Sep. 20, 2022

(54) OPTIMIZING MEDIA FINGERPRINT RETENTION TO IMPROVE SYSTEM RESOURCE UTILIZATION

(71) Applicant: INSCAPE DATA, INC., Irvine, CA (US)

(72) Inventors: Zeev Neumeier, Berkeley, CA (US); Michael Collette, San Rafael, CA (US)

(73) Assignee: INSCAPE DATA, INC., Irvine, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 16/854,048

(22) Filed: Apr. 21, 2020

(65) Prior Publication Data

US 2020/0322690 A1    Oct. 8, 2020

Related U.S. Application Data

(63) Continuation of application No. 16/106,319, filed on Aug. 21, 2018, now Pat. No. 10,674,223, which is a
(Continued)

(51) Int. Cl.
*H04N 21/61* (2011.01)
*G06F 16/783* (2019.01)
(Continued)

(52) U.S. Cl.
CPC ..... *H04N 21/6125* (2013.01); *G06F 16/7847* (2019.01); *G06V 10/40* (2022.01);
(Continued)

(58) Field of Classification Search
None
See application file for complete search history.

(56) References Cited

U.S. PATENT DOCUMENTS 4,677,466 A    6/1987 Lert, Jr. et al.
4,697,209 A    9/1987 Kiewit et al.
(Continued)

FOREIGN PATENT DOCUMENTS

CA    2501316    9/2005
CN    1557096    12/2004
(Continued)

OTHER PUBLICATIONS

International Search Report and Written Opinion dated Mar. 31, 2015 for PCT Application No. PCT/US2014/072255, 8 pages.
(Continued)

*Primary Examiner* — Jason K Lin
(74) *Attorney, Agent, or Firm* — Polsinelli LLP

(57) ABSTRACT

Provided are devices, computer-program products, and methods related to removing redundant data associated with frames. For example, a method can include storing a plurality of reference data sets in a reference database, where a reference data set is associated with a media segment. The method can further include receiving, by a server, cue data for a frame. The cue data includes a plurality of pixel data samples from the frame, and the frame is associated with an unidentified media segment. The method can further include identifying an absence of a pixel data sample from the cue data for the frame, and matching the cue data for the frame to a reference data set. The matching can include using a previous pixel data sample from a previous frame. The previous pixel data sample corresponds to the pixel data sample absent from the frame, and the reference data set is associated with a media segment. The method can further include determining the unidentified media segment is the media segment.

20 Claims, 15 Drawing Sheets

Related U.S. Application Data continuation of application No. 15/210,730, filed on Jul. 14, 2016, now Pat. No. 10,080,062.

(60) Provisional application No. 62/193,342, filed on Jul. 16, 2015.

(51) Int. Cl.

| | | |
|---|---|---|
| *H04N 21/44* | (2011.01) | |
| *G06V 10/40* | (2022.01) | |
| *G06V 10/75* | (2022.01) | |
| *H04N 21/234* | (2011.01) | |
| *H04N 21/845* | (2011.01) | |

(52) U.S. Cl.
CPC ..... *G06V 10/751* (2022.01); *H04N 21/23418* (2013.01); *H04N 21/44008* (2013.01); *H04N 21/845* (2013.01)

(56) References Cited

U.S. PATENT DOCUMENTS

| | | | |
|---|---|---|---|
| 4,739,398 | A | 4/1988 | Thomas et al. |
| 5,019,899 | A | 5/1991 | Boles et al. |
| 5,193,001 | A * | 3/1993 | Kerdranvrat ............ G06T 7/223 375/E7.181 |
| 5,210,820 | A | 5/1993 | Kenyon |
| 5,319,453 | A | 6/1994 | Copriviza et al. |
| 5,436,653 | A | 7/1995 | Ellis et al. |
| 5,481,294 | A | 1/1996 | Thomas et al. |
| 5,557,334 | A | 9/1996 | Legate |
| 5,572,246 | A | 11/1996 | Ellis et al. |
| 5,812,286 | A | 9/1998 | Li |
| 5,826,165 | A | 10/1998 | Echeita et al. |
| 5,918,223 | A | 6/1999 | Blum et al. |
| 6,008,802 | A | 12/1999 | Goldschmidt et al. |
| 6,025,837 | A | 2/2000 | Matthews, III et al. |
| 6,035,177 | A | 3/2000 | Moses et al. |
| 6,064,764 | A | 5/2000 | Bhaskaran et al. |
| 6,298,482 | B1 | 10/2001 | Seidman |
| 6,381,362 | B1 | 4/2002 | Deshpande et al. |
| 6,415,438 | B1 | 7/2002 | Blackketter et al. |
| 6,463,585 | B1 | 10/2002 | Hendricks et al. |
| 6,469,749 | B1 | 10/2002 | Dimitrova |
| 6,577,346 | B1 | 6/2003 | Perlman |
| 6,577,405 | B2 | 6/2003 | Kranz et al. |
| 6,628,801 | B2 | 9/2003 | Powell et al. |
| 6,647,548 | B1 | 11/2003 | Lu et al. |
| 6,675,174 | B1 | 1/2004 | Bolle et al. |
| 6,771,316 | B1 | 8/2004 | Iggulden |
| 6,804,659 | B1 | 10/2004 | Graham et al. |
| 6,978,470 | B2 | 12/2005 | Swix et al. |
| 6,990,453 | B2 | 1/2006 | Wang et al. |
| 7,028,327 | B1 | 4/2006 | Dougherty et al. |
| 7,039,930 | B1 | 5/2006 | Goodman et al. |
| 7,050,068 | B1 | 5/2006 | Bastos et al. |
| 7,051,351 | B2 | 5/2006 | Goldman et al. |
| 7,064,796 | B2 | 6/2006 | Roy et al. |
| 7,089,575 | B2 | 8/2006 | Agnihotri et al. |
| 7,098,959 | B2 | 8/2006 | Mishima et al. |
| 7,136,875 | B2 | 11/2006 | Anderson et al. |
| 7,178,106 | B2 | 2/2007 | Lamkin et al. |
| 7,210,157 | B2 | 4/2007 | Devara |
| 7,346,512 | B2 | 3/2008 | Wang et al. |
| 7,356,830 | B1 | 4/2008 | Dimitrova |
| 7,421,723 | B2 | 9/2008 | Harkness et al. |
| 7,545,984 | B1 * | 6/2009 | Kiel ..................... G06K 9/6215 382/221 |
| 7,590,998 | B2 | 9/2009 | Hanley |
| 7,623,823 | B2 | 11/2009 | Zito et al. |
| 7,787,696 | B2 | 8/2010 | Wilhelm et al. |
| 7,793,318 | B2 | 9/2010 | Deng |
| 7,933,451 | B2 | 4/2011 | Kloer |
| 7,991,764 | B2 | 8/2011 | Rathod |
| 8,001,571 | B1 | 8/2011 | Schwartz et al. |
| 8,094,872 | B1 | 1/2012 | Yagnik et al. |
| 8,171,004 | B1 | 5/2012 | Kaminski, Jr. et al. |
| 8,171,030 | B2 | 5/2012 | Peira et al. |
| 8,175,413 | B1 | 5/2012 | Ioffe et al. |
| 8,189,945 | B2 | 5/2012 | Stojancic et al. |
| 8,195,589 | B2 | 6/2012 | Bakke et al. |
| 8,195,689 | B2 | 6/2012 | Ramanathan et al. |
| 8,229,227 | B2 | 7/2012 | Stojancic et al. |
| 8,335,786 | B2 | 12/2012 | Peira et al. |
| 8,352,535 | B2 | 1/2013 | Peled |
| 8,364,703 | B2 | 1/2013 | Ramanathan et al. |
| 8,385,644 | B2 | 2/2013 | Stojancic et al. |
| 8,392,789 | B2 | 3/2013 | Biscondi et al. |
| 8,494,234 | B1 | 7/2013 | Djordjevic et al. |
| 8,522,283 | B2 | 8/2013 | Laligand et al. |
| 8,595,781 | B2 | 11/2013 | Neumeier et al. |
| 8,619,877 | B2 * | 12/2013 | McDowell ........ H04L 29/08729 375/240.26 |
| 8,625,902 | B2 | 1/2014 | Baheti et al. |
| 8,769,854 | B1 | 7/2014 | Battaglia |
| 8,776,105 | B2 | 7/2014 | Sinha et al. |
| 8,832,723 | B2 | 9/2014 | Sinha et al. |
| 8,856,817 | B2 | 10/2014 | Sinha et al. |
| 8,893,167 | B2 | 11/2014 | Sinha et al. |
| 8,893,168 | B2 | 11/2014 | Sinha et al. |
| 8,898,714 | B2 | 11/2014 | Neumeier et al. |
| 8,918,804 | B2 | 12/2014 | Sinha et al. |
| 8,918,832 | B2 | 12/2014 | Sinha et al. |
| 8,930,980 | B2 | 1/2015 | Neumeier et al. |
| 8,959,202 | B2 | 2/2015 | Haitsma et al. |
| 9,055,309 | B2 | 6/2015 | Neumeier et al. |
| 9,055,335 | B2 | 6/2015 | Neumeier et al. |
| 9,071,868 | B2 | 6/2015 | Neumeier et al. |
| 9,094,714 | B2 | 7/2015 | Neumeier et al. |
| 9,094,715 | B2 | 7/2015 | Neumeier et al. |
| 9,262,671 | B2 | 2/2016 | Unzueta |
| 9,368,021 | B2 | 6/2016 | Touloumtzis |
| 9,449,090 | B2 | 9/2016 | Neumeier et al. |
| 9,465,867 | B2 | 10/2016 | Hoarty |
| 9,838,753 | B2 | 12/2017 | Neumeier et al. |
| 9,955,192 | B2 | 4/2018 | Neumeier et al. |
| 10,080,062 | B2 | 9/2018 | Neumeier et al. |
| 10,116,972 | B2 | 10/2018 | Neumeier et al. |
| 10,169,455 | B2 | 1/2019 | Neumeier et al. |
| 10,185,768 | B2 | 1/2019 | Neumeier et al. |
| 10,192,138 | B2 | 1/2019 | Neumeier et al. |
| 10,271,098 | B2 | 4/2019 | Neumeier et al. |
| 10,284,884 | B2 | 5/2019 | Neumeier et al. |
| 10,306,274 | B2 | 5/2019 | Neumeier et al. |
| 10,375,451 | B2 | 8/2019 | Neumeier et al. |
| 10,405,014 | B2 | 9/2019 | Neumeier et al. |
| 2001/0039658 | A1 | 11/2001 | Walton |
| 2001/0044992 | A1 | 11/2001 | Jahrling |
| 2002/0026635 | A1 | 2/2002 | Wheeler et al. |
| 2002/0054069 | A1 | 5/2002 | Britt et al. |
| 2002/0054695 | A1 | 5/2002 | Bjorn et al. |
| 2002/0056088 | A1 | 5/2002 | Silva, Jr. et al. |
| 2002/0059633 | A1 | 5/2002 | Harkness et al. |
| 2002/0078144 | A1 | 6/2002 | Lamkin et al. |
| 2002/0083060 | A1 | 6/2002 | Wang et al. |
| 2002/0100041 | A1 | 7/2002 | Rosenberg et al. |
| 2002/0105907 | A1 | 8/2002 | Bruekers et al. |
| 2002/0120925 | A1 | 8/2002 | Logan |
| 2002/0122042 | A1 | 9/2002 | Bates |
| 2002/0162117 | A1 | 10/2002 | Pearson et al. |
| 2002/0162118 | A1 | 10/2002 | Levy et al. |
| 2003/0026422 | A1 | 2/2003 | Gerheim et al. |
| 2003/0086341 | A1 | 5/2003 | Wells |
| 2003/0105794 | A1 | 6/2003 | Jashinschi |
| 2003/0121037 | A1 | 6/2003 | Swix et al. |
| 2003/0121046 | A1 | 6/2003 | Roy et al. |
| 2003/0147561 | A1 | 8/2003 | Faibish et al. |
| 2003/0182291 | A1 | 9/2003 | Kurupati |
| 2003/0188321 | A1 | 10/2003 | Shoff et al. |
| 2003/0208763 | A1 | 11/2003 | McElhatten et al. |
| 2004/0045020 | A1 | 3/2004 | Witt et al. |
| 2004/0059708 | A1 | 3/2004 | Dean et al. |
| 2004/0183825 | A1 | 9/2004 | Stauder et al. |
| 2004/0216171 | A1 | 10/2004 | Barone et al. |

(56) References Cited

U.S. PATENT DOCUMENTS

| | | |
|---|---|---|
| 2004/0221237 A1 | 11/2004 | Foote et al. |
| 2004/0226035 A1 | 11/2004 | Hauser |
| 2004/0240562 A1 | 12/2004 | Bargeron et al. |
| 2005/0015795 A1 | 1/2005 | Iggulden |
| 2005/0015796 A1 | 1/2005 | Bruckner et al. |
| 2005/0027766 A1 | 2/2005 | Ben |
| 2005/0066352 A1 | 3/2005 | Herley |
| 2005/0120372 A1 | 6/2005 | Itakura |
| 2005/0149968 A1 | 7/2005 | Konig et al. |
| 2005/0172312 A1 | 8/2005 | Lienhart et al. |
| 2005/0207416 A1 | 9/2005 | Rajkotia |
| 2005/0209065 A1 | 9/2005 | Schlosser et al. |
| 2005/0235318 A1 | 10/2005 | Grauch et al. |
| 2006/0029286 A1 | 2/2006 | Lim et al. |
| 2006/0029368 A1 | 2/2006 | Harville |
| 2006/0031914 A1 | 2/2006 | Dakss et al. |
| 2006/0133647 A1 | 6/2006 | Werner et al. |
| 2006/0153296 A1 | 7/2006 | Deng |
| 2006/0155952 A1 | 7/2006 | Haas |
| 2006/0173831 A1 | 8/2006 | Basso et al. |
| 2006/0187358 A1 | 8/2006 | Lienhart et al. |
| 2006/0193506 A1 | 8/2006 | Dorphan et al. |
| 2006/0195857 A1 | 8/2006 | Wheeler et al. |
| 2006/0195860 A1 | 8/2006 | Eldering et al. |
| 2006/0245724 A1 | 11/2006 | Hwang et al. |
| 2006/0245725 A1 | 11/2006 | Lim |
| 2006/0253330 A1 | 11/2006 | Maggio et al. |
| 2006/0277047 A1 | 12/2006 | DeBusk et al. |
| 2006/0294561 A1 | 12/2006 | Grannan et al. |
| 2007/0009235 A1 | 1/2007 | Walters et al. |
| 2007/0033608 A1 | 2/2007 | Eigeldinger |
| 2007/0050832 A1 | 3/2007 | Wright et al. |
| 2007/0061724 A1 | 3/2007 | Slothouber et al. |
| 2007/0061831 A1 | 3/2007 | Savoor et al. |
| 2007/0083901 A1 | 4/2007 | Bond |
| 2007/0094696 A1 | 4/2007 | Sakai |
| 2007/0109449 A1 | 5/2007 | Cheung |
| 2007/0113263 A1 | 5/2007 | Chatani |
| 2007/0139563 A1 | 6/2007 | Zhong |
| 2007/0143796 A1 | 6/2007 | Malik |
| 2007/0168409 A1 | 7/2007 | Cheung |
| 2007/0180459 A1 | 8/2007 | Smithpeters et al. |
| 2007/0192782 A1 | 8/2007 | Ramaswamy |
| 2007/0242880 A1 | 10/2007 | Stebbings |
| 2007/0250901 A1 | 10/2007 | McIntire et al. |
| 2007/0261070 A1 | 11/2007 | Brown et al. |
| 2007/0261075 A1 | 11/2007 | Glasberg |
| 2007/0271300 A1 | 11/2007 | Ramaswamy |
| 2007/0274537 A1 | 11/2007 | Srinivasan |
| 2007/0300280 A1 | 12/2007 | Turner et al. |
| 2008/0044102 A1 | 2/2008 | Ekin |
| 2008/0046945 A1 | 2/2008 | Hanley |
| 2008/0089551 A1 | 4/2008 | Heather et al. |
| 2008/0138030 A1 | 6/2008 | Bryan et al. |
| 2008/0155588 A1 | 6/2008 | Roberts et al. |
| 2008/0155627 A1 | 6/2008 | O'Connor et al. |
| 2008/0172690 A1 | 7/2008 | Kanojia et al. |
| 2008/0208891 A1 | 8/2008 | Wang et al. |
| 2008/0240562 A1 | 10/2008 | Fukuda et al. |
| 2008/0263620 A1 | 10/2008 | Berkvens et al. |
| 2008/0276266 A1 | 11/2008 | Huchital et al. |
| 2008/0309819 A1 | 12/2008 | Hardacker et al. |
| 2008/0310731 A1 | 12/2008 | Stojancic et al. |
| 2008/0313140 A1 | 12/2008 | Pereira et al. |
| 2009/0007195 A1 | 1/2009 | Beyabani |
| 2009/0024923 A1 | 1/2009 | Hartwig et al. |
| 2009/0028517 A1 | 1/2009 | Shen et al. |
| 2009/0052784 A1 | 2/2009 | Covell et al. |
| 2009/0087027 A1 | 4/2009 | Eaton et al. |
| 2009/0088878 A1 | 4/2009 | Otsuka et al. |
| 2009/0100361 A1 | 4/2009 | Abello et al. |
| 2009/0116702 A1 | 5/2009 | Conradt |
| 2009/0131861 A1 | 5/2009 | Braig et al. |
| 2009/0172728 A1 | 7/2009 | Shkedi et al. |
| 2009/0172746 A1 | 7/2009 | Aldrey et al. |
| 2009/0175538 A1 | 7/2009 | Bronstein et al. |
| 2009/0213270 A1 | 8/2009 | Ismert et al. |
| 2009/0235312 A1 | 9/2009 | Morad et al. |
| 2010/0010648 A1 | 1/2010 | Bull et al. |
| 2010/0042790 A1 | 2/2010 | Mondal et al. |
| 2010/0083299 A1 | 4/2010 | Nelson |
| 2010/0115543 A1 | 5/2010 | Falcon |
| 2010/0115574 A1 | 5/2010 | Hardt et al. |
| 2010/0125870 A1 | 5/2010 | Ukawa et al. |
| 2010/0166257 A1 | 7/2010 | Wredenhagen |
| 2010/0199295 A1 | 8/2010 | Katpelly et al. |
| 2010/0235486 A1 | 9/2010 | White et al. |
| 2010/0253838 A1* | 10/2010 | Garg ................ H04N 7/0115 |
| | | 348/E7.003 |
| 2010/0269138 A1 | 10/2010 | Krikorian et al. |
| 2010/0306805 A1 | 12/2010 | Neumeier et al. |
| 2010/0306808 A1 | 12/2010 | Neumeier et al. |
| 2011/0015996 A1 | 1/2011 | Kassoway et al. |
| 2011/0026761 A1 | 2/2011 | Radhakrishnan et al. |
| 2011/0041154 A1 | 2/2011 | Olson |
| 2011/0055552 A1 | 3/2011 | Francis et al. |
| 2011/0096955 A1 | 4/2011 | Voloshynovskiy et al. |
| 2011/0251987 A1 | 4/2011 | Buchheit |
| 2011/0247042 A1 | 10/2011 | Mallinson |
| 2011/0289099 A1 | 11/2011 | Quan |
| 2011/0299770 A1 | 12/2011 | Vaddadi et al. |
| 2012/0017240 A1 | 1/2012 | Shkedi |
| 2012/0054143 A1 | 3/2012 | Doig et al. |
| 2012/0076357 A1* | 3/2012 | Yamamoto ......... H04N 21/8549 |
| | | 382/103 |
| 2012/0095958 A1 | 4/2012 | Pereira et al. |
| 2012/0117584 A1 | 5/2012 | Gordon |
| 2012/0158511 A1 | 6/2012 | Lucero et al. |
| 2012/0174155 A1 | 7/2012 | Mowrey et al. |
| 2012/0177249 A1 | 7/2012 | Levy et al. |
| 2012/0185566 A1 | 7/2012 | Nagasaka |
| 2012/0272259 A1 | 10/2012 | Cortes |
| 2012/0294586 A1 | 11/2012 | Weaver et al. |
| 2012/0317240 A1 | 12/2012 | Wang |
| 2012/0324494 A1 | 12/2012 | Burger et al. |
| 2013/0007191 A1 | 1/2013 | Klappert et al. |
| 2013/0007792 A1 | 1/2013 | Jeon et al. |
| 2013/0042262 A1 | 2/2013 | Riethmueller |
| 2013/0050564 A1 | 2/2013 | Adams et al. |
| 2013/0054356 A1 | 2/2013 | Richman et al. |
| 2013/0067523 A1 | 3/2013 | Etsuko et al. |
| 2013/0070847 A1 | 3/2013 | Iwamoto et al. |
| 2013/0108173 A1 | 5/2013 | Lienhart et al. |
| 2013/0139209 A1 | 5/2013 | Urrabazo et al. |
| 2013/0198768 A1 | 8/2013 | Kitazato |
| 2013/0202150 A1 | 8/2013 | Sinha et al. |
| 2013/0209065 A1 | 8/2013 | Yeung |
| 2013/0212609 A1 | 8/2013 | Sinha et al. |
| 2013/0290502 A1 | 10/2013 | Bilobrov |
| 2013/0297727 A1 | 11/2013 | Levy |
| 2013/0318096 A1 | 11/2013 | Cheung |
| 2014/0016696 A1 | 1/2014 | Nelson |
| 2014/0025837 A1 | 1/2014 | Swenson |
| 2014/0052737 A1 | 2/2014 | Ramanathan et al. |
| 2014/0082663 A1 | 3/2014 | Neumeier et al. |
| 2014/0088742 A1 | 3/2014 | Srinivasan |
| 2014/0123165 A1 | 5/2014 | Mukherjee et al. |
| 2014/0130092 A1 | 5/2014 | Kunisetty |
| 2014/0188487 A1 | 7/2014 | Perez Gonzalez |
| 2014/0193027 A1 | 7/2014 | Scherf |
| 2014/0195548 A1 | 7/2014 | Harron |
| 2014/0201769 A1 | 7/2014 | Neumeier et al. |
| 2014/0201772 A1 | 7/2014 | Neumeier et al. |
| 2014/0201787 A1* | 7/2014 | Neumeier ......... H04N 21/4394 |
| | | 725/34 |
| 2014/0219554 A1 | 8/2014 | Yamaguchi et al. |
| 2014/0237576 A1 | 8/2014 | Zhang |
| 2014/0258375 A1 | 9/2014 | Munoz |
| 2014/0270489 A1 | 9/2014 | Jaewhan et al. |
| 2014/0270504 A1 | 9/2014 | Baum et al. |
| 2014/0270505 A1 | 9/2014 | McCarthy |
| 2014/0282671 A1 | 9/2014 | McMillan |
| 2014/0293794 A1 | 10/2014 | Zhong et al. |
| 2014/0344880 A1 | 11/2014 | Geller et al. |

(56) References Cited

U.S. PATENT DOCUMENTS

| | | |
|---|---|---|
| 2015/0026728 A1 | 1/2015 | Carter et al. |
| 2015/0040074 A1 | 2/2015 | Hofmann et al. |
| 2015/0100979 A1 | 4/2015 | Moskowitz et al. |
| 2015/0112988 A1 | 4/2015 | Pereira et al. |
| 2015/0120839 A1 | 4/2015 | Kannan et al. |
| 2015/0121409 A1* | 4/2015 | Zhang ............... H04H 60/85 725/18 |
| 2015/0128161 A1 | 5/2015 | Conrad et al. |
| 2015/0163545 A1 | 6/2015 | Freed et al. |
| 2015/0181311 A1 | 6/2015 | Navin et al. |
| 2015/0229998 A1 | 8/2015 | Kaushal et al. |
| 2015/0256891 A1 | 9/2015 | Kim et al. |
| 2015/0302890 A1 | 10/2015 | Ergen et al. |
| 2015/0382075 A1 | 12/2015 | Neumeier et al. |
| 2016/0227261 A1 | 8/2016 | Neumeier et al. |
| 2016/0227291 A1 | 8/2016 | Shaw et al. |
| 2016/0286244 A1 | 9/2016 | Chang et al. |
| 2016/0307043 A1 | 10/2016 | Neumeier |
| 2016/0314794 A1 | 10/2016 | Leitman et al. |
| 2016/0353172 A1 | 12/2016 | Miller et al. |
| 2016/0359791 A1 | 12/2016 | Zhang et al. |
| 2017/0017645 A1 | 1/2017 | Neumeier et al. |
| 2017/0017651 A1 | 1/2017 | Neumeier et al. |
| 2017/0017652 A1 | 1/2017 | Neumeier et al. |
| 2017/0019716 A1 | 1/2017 | Neumeier et al. |
| 2017/0019719 A1 | 1/2017 | Neumeier et al. |
| 2017/0026671 A1 | 1/2017 | Neumeier et al. |
| 2017/0031573 A1 | 2/2017 | Kaneko |
| 2017/0032033 A1 | 2/2017 | Neumeier et al. |
| 2017/0032034 A1 | 2/2017 | Neumeier et al. |
| 2017/0134770 A9 | 5/2017 | Neumeier et al. |
| 2017/0186042 A1 | 6/2017 | Wong et al. |
| 2017/0311014 A1 | 10/2017 | Fleischman |
| 2017/0353776 A1 | 12/2017 | Holden et al. |
| 2018/0227646 A9 | 8/2018 | Navin et al. |

FOREIGN PATENT DOCUMENTS

| | | |
|---|---|---|
| CN | 101162470 | 4/2008 |
| CN | 1681304 | 7/2010 |
| CN | 102377960 | 3/2012 |
| CN | 101681373 | 9/2012 |
| EP | 248 533 | 8/1994 |
| EP | 1578126 | 9/2005 |
| EP | 1 760 693 | 3/2007 |
| EP | 1504445 B1 | 8/2008 |
| EP | 2 084 624 | 8/2009 |
| EP | 2 352 289 | 8/2011 |
| EP | 2 541 963 A2 | 1/2013 |
| EP | 2 685 450 A1 | 1/2014 |
| GB | 2457694 | 8/2009 |
| WO | 0144992 | 6/2001 |
| WO | 2005/101998 | 11/2005 |
| WO | 2007/114796 | 10/2007 |
| WO | 2008/065340 | 6/2008 |
| WO | 2009/131861 | 10/2009 |
| WO | 2009/150425 | 12/2009 |
| WO | 2010/135082 | 11/2010 |
| WO | 2011/090540 A2 | 7/2011 |
| WO | 2012/057724 | 5/2012 |
| WO | 2012/108975 | 8/2012 |
| WO | 2012/170451 | 12/2012 |
| WO | 2014/142758 | 9/2014 |
| WO | 2014/145929 A1 | 9/2014 |
| WO | 2015/100372 A1 | 7/2015 |
| WO | 2016/123495 | 8/2016 |
| WO | 2016/168556 | 10/2016 |
| WO | 2017/011758 | 1/2017 |
| WO | 2017/011792 | 1/2017 |

OTHER PUBLICATIONS

International Search Report and Written Opinion dated Apr. 26, 2016 for PCT Application No. PCT/US2016/015681, 13 pages.

"How to: Watch from the beginning |About DISH" (Dec. 31, 2014) XP055265764, retrieved on Apr. 15, 2016 from URL:http://about.dish.com/blog/hopper/how-watch-beginning 2 pages.

International Search Report and Written Opinion dated Jun. 24, 2016 for PCT Application No. PCT/US2016/027691, 13 pages.

Gionis et al., "Similarity Search in High Dimension via Hashing", Proceedings of the 25th VLDB Conference, 1999, 12 pages.

Huang, "Bounded Coordinate System Indexing for Real-time Video Clip Search", Retrieved from the Internet:URL:http://staff.itee.uq.edu.aujzxf/papers/TOIS.pdf, Jan. 1, 2009, 32 pages.

Kim et al., "Edge-Based Spatial Descriptor Using Color Vector Angle for Effective Image Retrieval", Modeling Decisions for Artificial Intelligence; [Lecture Notes in Computer Science; Lecture Notes in Artificial Intelligence, Jul. 1, 2005, pp. 365-375.

Liu et al., "Near-duplicate video retrieval", ACM Computing Surveys, vol. 45, No. 4, Aug. 30, 2013, pp. 1-23.

International Search Report and Written Opinion dated Oct. 12, 2016 for PCT Application No. PCT/US2016/042522,13 pages.

International Search Report and Written Opinion dated Oct. 11, 2016 for PCT Application No. PCT/US2016/042621, 13 pages.

International Search Report and Written Opinion dated Oct. 20, 2016 for PCT Application No. PCT/US2016/042611,12 pages.

Scouarnec et al., "Cache policies for cloud-based systems:To keep or not to keep", 2014 IEEE 7th International Conference on Cloud Computing, IEEE XP032696624, Jun. 27, 2014, pp. 1-8.

International Search Report and Written Opinion dated Oct. 25, 2016 for PCT Application No. PCT/US2016/042564, 14 pages.

Anonymous; "Cache (computing)" Wikipedia, the free encyclopedia, URL:http://en.wikipedia.org/w/index.phpti tle=Cache (computing) &oldid=474222804, Jan. 31, 2012; 6 pages.

International Search Report and Written Opinion dated Oct. 24, 2016 for PCT Application No. PCT/US2016/042557, 11 pages.

Anil K. Jain, "Image Coding Via a Nearest Neighbors Image Model" IEEE Transactions on Communications, vol. Com-23, No. 3, Mar. 1975, pp. 318-331.

Lee et al., "Fast Video Search Algorithm for Large Video Database Using Adjacent Pixel Intensity Difference Quantization Histogram Feature" International Journal of Computer Science and Network Security, vol. 9, No. 9, Sep. 2009, pp. 214-220.

Li et al., A Confidence Based Recognition System for TV Commercial Extraction, Conferences in Research and Practice in Information Technology vol. 75, 2008.

International Search Report and Written Opinion dated Jul. 27, 2011 for PCT Application No. PCT/US2010/057153, 8 pages.

International Search Report and Written Opinion dated Aug. 31, 2011 for PCT Application No. PCT/US2010/057155, 8 pages.

International Search Report and Written Opinion dated Aug. 26, 2014 for PCT Application No. PCT/US2014/030782; 11 pages.

International Search Report and Written Opinion dated Jul. 21, 2014 for PCT Application No. PCT/US2014/030795; 10 pages.

International Search Report and Written Opinion, dated Jul. 25, 2014 for PCT Application No. PCT/US2014/030805, 10 pages.

Extended European Search Report dated Mar. 7, 2013 for European Application No. 12178359.1, 8 pages.

Extended European Search Report dated Oct. 11, 2013 for European Application No. 10844152.8, 19 pages.

Kabal (P.), Ramachandran (R.P.): The computation of line spectral frequencies using Chebyshev polynomials, IEEE Trans. on ASSP, vol. 34, No. 6, pp. 1419-1426, 1986.

Itakura (F.): Line spectral representation of linear predictive coefficients of speech signals, J. Acoust. Soc. Amer., vol. 57, Supplement No. 1, S35, 1975, 3 pages.

Bistritz (Y.), Pellerm (S.): Immittance Spectral Pairs (ISP) for speech encoding, Proc. ICASSP'93, pp. 11-19 to 11-12.

International Search Report and Written Opinion dated Mar. 8, 2016 for PCT Application No. PCT/ US2015/062945; 9 pages.

Extended European Search Report dated Dec. 21, 2016 for European Application No. 14763506.4, 11 pages.

Extended European Search Report dated Nov. 23, 2016 for European Application No. 14764182.3, 10 pages.

Extended European Search Report dated Jan. 24, 2017 for European Application No. 14762850.7, 12 pages.

(56) References Cited

OTHER PUBLICATIONS

Extended European Search Report dated Jun. 16, 2017, for European Patent Application No. 14873564.0, 8 pages.
Extended European Search Report dated Jun. 28, 2019, for European Patent Application No. 19166400.2, 9 pages.
U.S. Appl. No. 14/551,933, "Final Office Action", dated May 23, 2016, 19 pages.
U.S. Appl. No. 14/551,933, "Non-Final Office Action", dated Oct. 17, 2016, 15 pages.
U.S. Appl. No. 14/551,933, "Non-Final Office Action", dated Dec. 31, 2015, 24 pages.
U.S. Appl. No. 14/551,933, "Notice of Allowance", dated Mar. 21, 2017, 8 pages.
U.S. Appl. No. 14/217,039, "Non-Final Office Action", dated May 23, 2014, 27 pages.
U.S. Appl. No. 14/217,039, "Final Office Action", dated Nov. 7, 2014, 15 pages.
U.S. Appl. No. 14/217,039, "Notice of Allowance", dated Jan. 29, 2015, 8 pages.
U.S. Appl. No. 14/678,856, "Non-Final Office Action", dated Dec. 1, 2015, 28 pages.
U.S. Appl. No. 14/678,856, "Notice of Allowance", dated May 20, 2016, 9 pages.
U.S. Appl. No. 14/217,075, "Non-Final Office Action", dated Jul. 16, 2014, 39 pages.
U.S. Appl. No. 14/217,075, "Notice of Allowance ", dated Feb. 20, 2015, 51 pages.
U.S. Appl. No. 14/217,094, "Notice of Allowance", dated Sep. 4, 2014, 30 pages.
U.S. Appl. No. 14/217,375, "Non-Final Office Action", dated Apr. 1, 2015, 39 pages.
U.S. Appl. No. 14/217,375, "Notice of Allowance", dated Apr. 1, 2015, 31 pages.
U.S. Appl. No. 14/217,425, "Non-Final Office Action", dated Apr. 7, 2015, 12 pages.
U.S. Appl. No. 14/217,425, "Notice of Allowance", dated May 20, 2015, 15 pages.
U.S. Appl. No. 14/217,435, "Non-Final Office Action", dated Nov. 24, 2014, 9 pages.
U.S. Appl. No. 14/217,435, "Notice of Allowance", dated Jun. 5, 2015, 9 pages.
U.S. Appl. No. 15/011,099, "First Action Interview Office Action Summary", dated May 9, 2017, 6 pages.
U.S. Appl. No. 15/011,099, "First Action Interview Pilot Program Pre-Interview Communication", dated Feb. 28, 2017, 5 pages.
U.S. Appl. No. 12/788,721, "Non-Final Office Action", dated Mar. 28, 2012, 15 Pages.
U.S. Appl. No. 12/788,721, "Final Office Action", dated Aug. 15, 2012, 22 Pages.
U.S. Appl. No. 12/788,721, "Notice of Allowance", dated Aug. 15, 2013, 16 Pages.
U.S. Appl. No. 14/763,158, "Non-Final Office Action", dated Jun. 27, 2016, 16 Pages.
U.S. Appl. No. 14/763,158, "Final Office Action", dated Sep. 7, 2016, 12 Pages.
U.S. Appl. No. 14/763,158, "Notice of Allowance", dated Mar. 17, 2016, 8 Pages.
U.S. Appl. No. 14/807,849, "Non-Final Office Action", dated Nov. 25, 2015, 12 Pages.
U.S. Appl. No. 14/807,849, "Final Office Action", dated Apr. 19, 2016, 13 pages.
U.S. Appl. No. 14/807,849, "Non-Final Office Action", dated Feb. 28, 2017, 10 Pages.
U.S. Appl. No. 14/089,003, "Notice of Allowance", dated Jul. 30, 2014, 24 Pages.
U.S. Appl. No. 12/788,748, "Non-Final Office Action", dated Jan. 10, 2013, 10 Pages.
U.S. Appl. No. 12/788,748, "Final Office Action", dated Nov. 21, 2013, 13 Pages.
U.S. Appl. No. 12/788,748, "Notice of Allowance", dated Mar. 6, 2014, 7 Pages.
U.S. Appl. No. 14/953,994, "Non-Final Office Action", dated Mar. 3, 2016, 34 Pages.
U.S. Appl. No. 14/953,994, "Final Office Action", dated Jun. 1, 2016, 36 Pages.
U.S. Appl. No. 14/953,994, "Notice of Allowance", dated Aug. 31, 2016, 15 Pages.
U.S. Appl. No. 14/807,849, "Final Office Action", dated Jun. 22, 2017, 10 pages.
U.S. Appl. No. 15/011,099, "Final Office Action", dated Jul. 24, 2017, 22 pages.
U.S. Appl. No. 15/240,801, "Non-Final Office Action", dated Aug. 11, 2017, 18 pages.
U.S. Appl. No. 15/240,815, "Non-Final Office Action", dated Aug. 23, 2017, 15 pages.
U.S. Appl. No. 15/211,345, "First Action Interview Pilot Program Pre-Interview Communication", dated Sep. 19, 2017, 8 pages.
U.S. Appl. No. 14/807,849, "Notice of Allowance", dated Nov. 30, 2017, 9 Pages.
U.S. Appl. No. 15/240,801, "Final Office Action", dated Dec. 22, 2017, 24 pages.
U.S. Appl. No. 15/011,099, "Non-Final Office Action", dated Jan. 22, 2018, 23 pages.
U.S. Appl. No. 15/240,815, "Final Office Action", dated Mar. 2, 2018, 14 pages.
U.S. Appl. No. 15/211,345, "Final Office Action", dated Mar. 2, 2018, 14 pages.
Extended European Search Report dated Mar. 22, 2018 for European Application No. 15865033.3, 10 pages.
U.S. Appl. No. 15/099,842, "Final Office Action", dated Apr. 2, 2018, 8 pages.
U.S. Appl. No. 15/210,730, "Notice of Allowance", dated May 23, 2018, 10 pages.
U.S. Appl. No. 15/796,706, "Non-Final Office Action", dated Jun. 26, 2018, 17 pages.
U.S. Appl. No. 15/011,099, "Notice of Allowance", dated Jun. 28, 2018, 12 pages.
U.S. Appl. No. 15/796,698, "Non-Final Office Action", dated Jul. 5, 2018, 15 pages.
U.S. Appl. No. 15/240,801, "Notice of Allowance", dated Aug. 30, 2018, 9 pages.
U.S. Appl. No. 15/211,345, "Non-Final Office Action", dated Sep. 4, 2018, 13 pages.
U.S. Appl. No. 15/099,842, "Notice of Allowance", dated Sep. 7, 2018, 10 pages.
U.S. Appl. No. 15/240,815, "Notice of Allowance", dated Sep. 12, 2018, 9 pages.
U.S. Appl. No. 15/290,848, "First Action Interview Office Action Summary", dated Nov. 2, 2018, 5 pages.
U.S. Appl. No. 15/796,692, "Notice of Allowance", dated Dec. 5, 2018, 8 pages.
U.S. Appl. No. 15/796,698, "Notice of Allowance", dated Dec. 20, 2018, 8 pages.
U.S. Appl. No. 15/796,706, "Notice of Allowance", dated Jan. 11, 2019, 9 pages.
U.S. Appl. No. 15/211,508, "Non-Final Office Action", dated Jan. 10, 2019, 20 pages.
U.S. Appl. No. 15/211,492, "Non-Final Office Action", dated Jan. 11, 2019, 19 pages.
U.S. Appl. No. 16/141,598, "First Action Interview Office Action Summary", dated Jan. 11, 2019, 8 pages.
U.S. Appl. No. 15/290,848, "Non-Final Office Action", dated Mar. 5, 2019, 5 pages.
U.S. Appl. No. 15/211,991, "Non-Final Office Action", dated Feb. 26, 2019, 8 pages.
U.S. Appl. No. 15/211,345, "Notice of Allowance", dated Mar. 20, 2019, 6 pages.
U.S. Appl. No. 16/210,796, "Non-Final Office Action", dated Mar. 22, 2019, 7 pages.
U.S. Appl. No. 16/141,598, "Notice of Allowance", dated Apr. 25, 2019, 11 pages.

(56) References Cited

OTHER PUBLICATIONS

U.S. Appl. No. 15/211,508, "Final Office Action", dated Jun. 20, 2019, 20 pages.
U.S. Appl. No. 15/211,492, "Final Office Action", dated Jun. 20, 2019, 18 pages.
U.S. Appl. No. 16/210,796, "Notice of Allowance", dated Jul. 11, 2019, 9 pages.
U.S. Appl. No. 16/214,875, "Non-Final Office Action", dated Jul. 29, 2019, 12 pages.
U.S. Appl. No. 15/211,991, "Final Office Action", dated Oct. 31, 2019, 9 pages.
U.S. Appl. No. 16/214,875, "Final Office Action", dated Jan. 29, 2020, 13 pages.
U.S. Appl. No. 16/290,055, "Non-Final Office Action", dated Feb. 19, 2020, 18 pages.
U.S. Appl. No. 16/379,663, "Non-Final Office Action", dated Feb. 24, 2020, 19 pages.
U.S. Appl. No. 15/211,991, "Non-Final Office Action", dated Mar. 19, 2020, 19 pages.
U.S. Appl. No. 15/211,508, "Non-Final Office Action", dated Apr. 3, 2020, 25 pages.
U.S. Appl. No. 15/211,492, "Non-Final Office Action", dated Apr. 6, 2020, 18 pages.
U.S. Appl. No. 16/290,055, "Notice of Allowance", dated Jun. 25, 2020, 10 pages.

* cited by examiner

OPTIMIZING MEDIA FINGERPRINT RETENTION TO IMPROVE SYSTEM RESOURCE UTILIZATION

CROSS-REFERENCES TO RELATED APPLICATIONS

This application is a continuation of U.S. application Ser. No. 16/106,319 filed Aug. 21, 2018, which is a continuation of U.S. application Ser. No. 15/210,730 filed Jul. 14, 2016, which claims the benefit of U.S. Provisional Application No. 62/193,342 filed on Jul. 16, 2015, the entire disclosures of each of which are incorporated herein by reference for all purposes. This application also incorporates by reference the following in their entirety and for all purposes: U.S. patent application Ser. No. 14/089,003, which was filed on Nov. 25, 2013, U.S. Provisional Application No. 61/182,334, which was filed on May 29, 2009, U.S. Provisional Application No. 61/290,714, which was filed on Dec. 29, 2009, U.S. application Ser. No. 12/788,748, which was filed on May 27, 2015, and U.S. application Ser. No. 12/788,721, which was filed on May 27, 2015.

FIELD

The present disclosure relates to improving management of system resources used for recognition of content displayed by a media system (e.g., a television system, a computer system, or other electronic device capable of connecting to the Internet). In some examples, various techniques and systems are provided for removing portions of data sent to a matching server in order to reduce an amount of data sent to the matching server and an amount of data stored by either the matching server or a database associated with the matching server.

BACKGROUND

Managing dense datasets provides significant challenges. For example, there are difficulties in storing, indexing, and managing large amounts of data. Such difficulties can arise in systems that search for and identify a closest match between data using reference data stored in data sets.

SUMMARY

Provided are devices, computer-program products, and methods for removing redundant data associated with frames. The removal can be performed by a media system or by a matching server. In some implementations, a device, computer-program product, and method for removing redundant data is provided. For example, a method can include receiving an initial frame. In some examples, the initial frame includes pixel data. The method can further include determining initial cue data for the initial frame. In some examples, the initial cue data includes a plurality of initial pixel data samples associated with the initial frame.

The method can further include sending the initial cue data. In some examples, the initial cue data is addressed to a server. The method can further include receiving a new frame. In some examples, the new frame includes pixel data. The method can further include determining new cue data for the new frame. In some examples, the new cue data includes a plurality of new pixel data samples associated with the new frame. The method can further include identifying a pixel value range. In some examples, pixel data samples are determined to be similar when a pixel value difference between the pixel data samples is within the pixel value range.

The method can further include determining a pixel value difference between an initial pixel data sample and a new pixel data sample. In some examples, the initial pixel data sample corresponds to the new pixel data sample. The method can further include determining the pixel value difference is within the pixel value range. The method can further include updating the new cue data by removing the new pixel data sample from the new cue data when the pixel value difference is within the pixel value range. The method can further include sending the updated new cue data. In some examples, the updated new cue data is addressed to the server.

In some implementations, the method can further include sending a flag indicating that the new pixel data sample is removed from the new cue data. In some examples, the flag is addressed to the server.

In some implementations, the method can further include sending a flag indicating that a row of pixel data samples are removed from the new cue data. In such implementations, the new pixel data sample is included in the row. In some examples, the flag is addressed to the server.

In some implementations, a pixel data sample is computed from a pixel patch. In some examples, the flag is addressed to the server. In such implementations, the pixel patch includes an array of pixels of a frame. In some implementations, the pixel data sample is computed by taking an average of pixel values of pixels in the pixel patch In some implementations, a device, computer-program product, and method for matching data with one or more portions removed. For example, the method can include storing a plurality of reference data sets in a reference database. In some examples, a reference data set is associated with a media segment. The method can further include receiving, by a server, cue data for a frame. In some examples, the cue data includes a plurality of pixel data samples from the frame. In some examples, the frame is associated with an unidentified media segment.

The method can further include identifying an absence of a pixel data sample from the cue data for the frame. The method can further include matching the cue data for the frame to a reference data set. In some examples, matching includes using a previous pixel data sample of a previous cue data. In some example, the previous cue data is from a previous frame. In some examples, the previous pixel data sample corresponds to the pixel data sample absent from the frame. In some examples, the reference data set is associated with a media segment. The method can further include determining the unidentified media segment is the media segment.

In some implementations, the method can further include receiving a flag indicating the pixel data sample is absent from the cue data. In such implementations, the absence of the pixel data sample is identified using the flag.

In some implementations, the method can further include receiving a flag indicating a row of pixel data samples is absent from the cue data. In such implementations, the pixel data sample is included in the row.

In some implementations, identifying the absence of the pixel data sample includes analyzing the cue data for a missing pixel data sample.

In some implementations, the method can further include identifying the previous cue data. In such implementations, the method can further include determining that the previous cue data includes the previous pixel data sample.

In some implementations, the method can further include identifying the previous cue data. In such implementations, the method can further include determining that the previous pixel data sample is not absent from the previous cue data. In such implementations, the method can further include determining to use the previous pixel data sample for matching the cue data for the frame to the reference data set.

The features, aspects, and advantages of the present disclosure will be most easily understood when the following description is read with reference to the accompanying drawings in which like numerical identifications represent like components or parts throughout the drawings.

BRIEF DESCRIPTION OF THE FIGURES

Illustrative examples are described in detail below with reference to the following figures.

DETAILED DESCRIPTION

Figure 1:
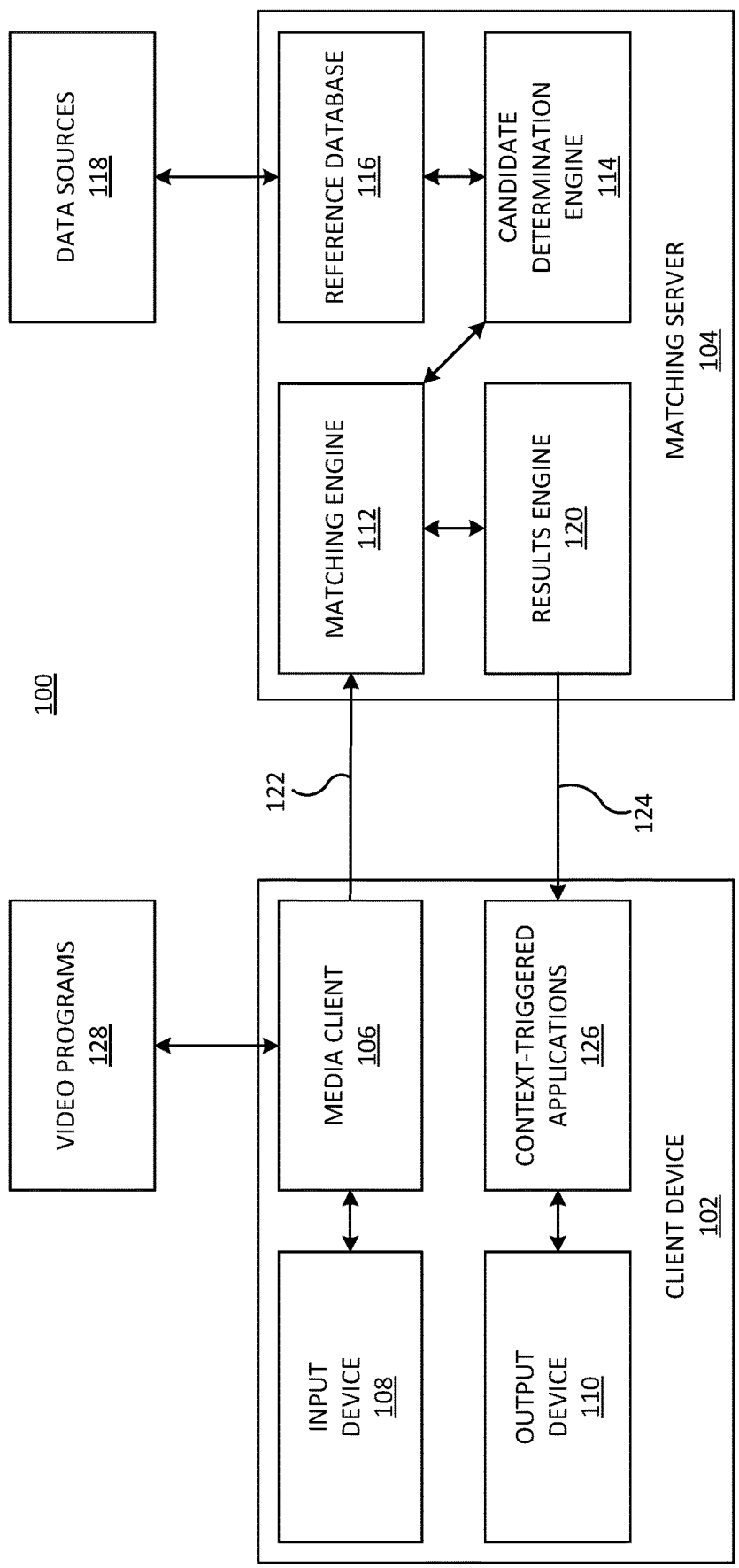
FIG. 1 is a block diagram of an example of a matching system for identifying video content being viewed by a media system.

In the following description, for the purposes of explanation, specific details are set forth in order to provide a thorough understanding of examples of this disclosure. However, it will be apparent that various examples may be practiced without these specific details. The figures and description are not intended to be restrictive.

The ensuing description provides exemplary examples only, and is not intended to limit the scope, applicability, or configuration of this disclosure. Rather, the ensuing description of the exemplary examples will provide those skilled in the art with an enabling description for implementing an exemplary example. It should be understood that various changes may be made in the function and arrangement of elements without departing from the spirit and scope of this disclosure as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, or other information may be passed, forwarded, or transmitted using any suitable means including memory sharing, message passing, token passing, network transmission, or other transmission technique.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some examples, the systems may be configured as a distributed system where one or more components of the system are distributed across one or more networks in a cloud computing system.

As described in further detail below, certain aspects and features of the present disclosure relate to identifying unknown video segments by comparing unknown data points to one or more reference data points. The systems and methods described herein improve the efficiency of storing and searching large datasets that are used to identify the unknown video segments. For example, the systems and methods allow identification of the unknown data segments while reducing the density of the large datasets required to perform the identification. The techniques can be applied to any system that harvests and manipulates large volumes of data. Illustrative examples of these systems include automated content-based searching systems (e.g., automated content recognition for video-related applications or other suitable application), MapReduce systems, Bigtable systems, pattern recognition systems, facial recognition systems, classification systems, computer vision systems, data compression systems, cluster analysis, or any other suitable system. One of ordinary skill in the art will appreciate that the techniques described herein can be applied to any other system that stores data that is compared to unknown data. In the context of automated content recognition (ACR), for example, the systems and methods reduce the amount of data that must be stored in order for a matching system to search and find relationships between unknown and known data groups.

By way of example only and without limitation, some examples described herein use an automated audio and/or video content recognition system for illustrative purposes. However, one of ordinary skill in the art will appreciate that the other systems can use the same techniques.

A significant challenge with ACR systems and other systems that use large volumes of data can be managing the amount of data that is required for the system to function. Another challenge includes a need to build and maintain a database of known content to serve as a reference to match incoming content. Building and maintaining such a database involves collecting and digesting a vast amount (e.g., hundreds, thousands, or more) of content (e.g., nationally distributed television programs and an even larger amount of local television broadcasts among many other potential content sources). The digesting can be performed using any available technique that reduces the raw data (e.g., video or audio) into compressed, searchable data. With a 24-hour, seven-day-a-week operating schedule and a sliding window of perhaps two weeks of content (e.g., television programming) to store, the data volume required to perform ACR can build rapidly. Similar challenges can be present with other systems that harvest and manipulate large volumes of data, such as the example systems described above.

The systems and methods described herein can allow improved management of system resources in an ACR system. For example, examples can increase the efficiency of system resource utilization by managing data sent to and/or stored on the ACR system. While description herein can refer to a video segment, other media segments can also be used, including audio segments.

FIG. 1 illustrates a matching system 100 that can identify unknown content. In some examples, the unknown content can include one or more unknown data points. In such examples, the matching system 100 can match unknown data points with reference data points to identify unknown video segments associated with the unknown data points. The reference data points can be included in a reference database 116.

The matching system 100 includes a client device 102 and a matching server 104. The client device 102 includes a media client 106, an input device 108, an output device 110, and one or more contextual applications 126. The media client 106 (which can include a television system, a computer system, or other electronic device capable of connecting to the Internet) can decode data (e.g., broadcast signals, data packets, or other frame data) associated with video programs 128. The media client 106 can place the decoded contents of each frame of the video into a video frame buffer in preparation for display or for further processing of pixel information of the video frames. The client device 102 can be any electronic decoding system that can receive and decode a video signal. The client device 102 can receive video programs 128 and store video information in a video buffer (not shown). The client device 102 can process the video buffer information and produce unknown data points (which can referred to as "cues"), described in more detail below with respect to FIG. 3. The media client 106 can transmit the unknown data points to the matching server 104 for comparison with reference data points in the reference database 116.

The input device 108 can include any suitable device that allows a request or other information to be input to the media client 106. For example, the input device 108 can include a keyboard, a mouse, a voice-recognition input device, a wireless interface for receiving wireless input from a wireless device (e.g., from a remote controller, a mobile device, or other suitable wireless device), or any other suitable input device. The output device 110 can include any suitable device that can present or otherwise output information, such as a display, a wireless interface for transmitting a wireless output to a wireless device (e.g., to a mobile device or other suitable wireless device), a printer, or other suitable output device.

The matching system 100 can begin a process of identifying a video segment by first collecting data samples from known video data sources 118. For example, the matching server 104 collects data to build and maintain a reference database 116 from a variety of video data sources 118. The video data sources 118 can include media providers of television programs, movies, or any other suitable video source. Video data from the video data sources 118 can be provided as over-the-air broadcasts, as cable TV channels, as streaming sources from the Internet, and from any other video data source. In some examples, the matching server 104 can process the received video from the video data sources 118 to generate and collect reference video data points in the reference database 116, as described below. In some examples, video programs from video data sources 118 can be processed by a reference video program ingest system (not shown), which can produce the reference video data points and send them to the reference database 116 for storage. The reference data points can be used as described above to determine information that is then used to analyze unknown data points.

The matching server 104 can store reference video data points for each video program received for a period of time (e.g., a number of days, a number of weeks, a number of months, or any other suitable period of time) in the reference database 116. The matching server 104 can build and continuously or periodically update the reference database 116 of television programming samples (e.g., including reference data points, which may also be referred to as cues or cue values). In some examples, the data collected is a compressed representation of the video information sampled from periodic video frames (e.g., every fifth video frame, every tenth video frame, every fifteenth video frame, or other suitable number of frames). In some examples, a number of bytes of data per frame (e.g., 25 bytes, 50 bytes, 75 bytes, 100 bytes, or any other amount of bytes per frame) are collected for each program source. Any number of program sources can be used to obtain video, such as 25 channels, 50 channels, 75 channels, 100 channels, 200 channels, or any other number of program sources. Using the example amount of data, the total data collected during a 24-hour period over three days becomes very large. Therefore, reducing the number of actual reference data point sets is advantageous in reducing the storage load of the matching server 104.

The media client 106 can send a communication 122 to a matching engine 112 of the matching server 104. The communication 122 can include a request for the matching engine 112 to identify unknown content. For example, the unknown content can include one or more unknown data points and the reference database 116 can include a plurality of reference data points. The matching engine 112 can identify the unknown content by matching the unknown data points to reference data in the reference database 116. In some examples, the unknown content can include unknown video data being presented by a display (for video-based ACR), a search query (for a MapReduce system, a Bigtable system, or other data storage system), an unknown image of a face (for facial recognition), an unknown image of a pattern (for pattern recognition), or any other unknown data that can be matched against a database of reference data. The reference data points can be derived from data received from the video data sources 118. For example, data points can be extracted from the information provided from the video data sources 118 and can be indexed and stored in the reference database 116.

The matching engine 112 can send a request to the candidate determination engine 114 to determine candidate data points from the reference database 116. A candidate data point can be a reference data point that is a certain determined distance from the unknown data point. In some examples, a distance between a reference data point and an unknown data point can be determined by comparing one or more pixels (e.g., a single pixel, a value representing group of pixels (e.g., a mean, an average, a median, or other value), or other suitable number of pixels) of the reference data point with one or more pixels of the unknown data point. In some examples, a reference data point can be the certain determined distance from an unknown data point when the pixels at each sample location are within a particular pixel value range.

In one illustrative example, a pixel value of a pixel can include a red value, a green value, and a blue value (in a red-green-blue (RGB) color space). In such an example, a first pixel (or value representing a first group of pixels) can be compared to a second pixel (or value representing a second group of pixels) by comparing the corresponding red values, green values, and blue values respectively, and ensuring that the values are within a certain value range (e.g., within 0-5 values). For example, the first pixel can be matched with the second pixel when (1) a red value of the first pixel is within 5 values in a 0-255 value range (plus or minus) of a red value of the second pixel, (2) a green value of the first pixel is within 5 values in a 0-255 value range (plus or minus) of a green value of the second pixel, and (3) a blue value of the first pixel is within 5 values in a 0-255 value range (plus or minus) of a blue value of the second pixel. In such an example, a candidate data point is a reference data point that is an approximate match to the unknown data point, leading to multiple candidate data points (related to different media segments) being identified for the unknown data point. The candidate determination engine 114 can return the candidate data points to the matching engine 112.

For a candidate data point, the matching engine 112 can add a token into a bin that is associated with the candidate data point and that is assigned to an identified video segment from which the candidate data point is derived. A corresponding token can be added to all bins that correspond to identified candidate data points. As more unknown data points (corresponding to the unknown content being viewed) are received by the matching server 104 from the client device 102, a similar candidate data point determination process can be performed, and tokens can be added to the bins corresponding to identified candidate data points. Only one of the bins corresponds to the segment of the unknown video content being viewed, with the other bins corresponding to candidate data points that are matched due to similar data point values (e.g., having similar pixel color values), but that do not correspond to the actual segment being viewed. The bin for the unknown video content segment being viewed will have more tokens assigned to it than other bins for segments that are not being watched. For example, as more unknown data points are received, a larger number of reference data points that correspond to the bin are identified as candidate data points, leading to more tokens being added to the bin. Once a bin includes a particular number of tokens, the matching engine 112 can determine that the video segment associated with the bin is currently being displayed on the client device 102. A video segment can include an entire video program or a portion of the video program. For example, a video segment can be a video program, a scene of a video program, one or more frames of a video program, or any other portion of a video program.

Figure 2:
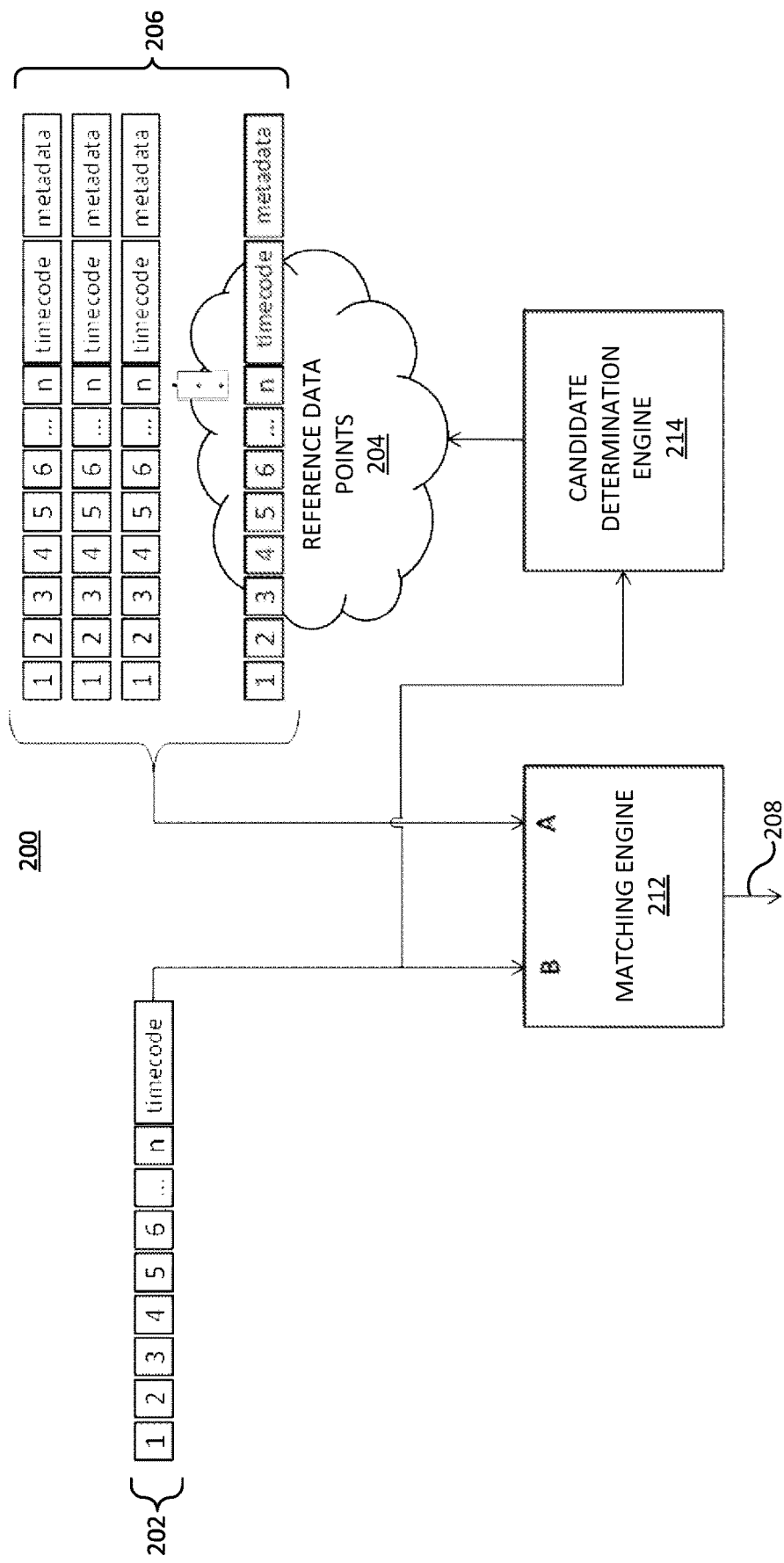
FIG. 2 illustrates an example of a matching system identifying unknown data points.

FIG. 2 illustrates components of a matching system 200 for identifying unknown data. For example, the matching engine 212 can perform a matching process for identifying unknown content (e.g., unknown media segments, a search query, an image of a face or a pattern, or the like) using a database of known content (e.g., known media segments, information stored in a database for searching against, known faces or patterns, or the like). For example, the matching engine 212 receives unknown data content 202 (which can be referred to as "cue data") to be matched with a reference data point of the reference data points 204 in a reference database. The unknown data content 202 can also be received by the candidate determination engine 214, or sent to the candidate determination engine 214 from the matching engine 212. The candidate determination engine 214 can conduct a search process to identify candidate data points 206 by searching the reference data points 204 in the reference database. In one example, the search process can include a nearest neighbor search process to produce a set of neighboring values (that are a certain distance from the unknown values of the unknown data content 202). The candidate data points 206 are input to the matching engine 212 for conducting the matching process to generate a matching result 208. Depending on the application, the matching result 208 can include video data being presented by a display, a search result, a determined face using facial recognition, a determined pattern using pattern recognition, or any other result.

In determining candidate data points 206 for an unknown data point (e.g., unknown data content 202), the candidate determination engine 214 determines a distance between the unknown data point and the reference data points 204 in the reference database. The reference data points that are a certain distance from the unknown data point are identified as the candidate data points 206. In some examples, a distance between a reference data point and an unknown data point can be determined by comparing one or more pixels of the reference data point with one or more pixels of the unknown data point, as described above with respect to FIG. 1. In some examples, a reference data point can be the certain distance from an unknown data point when the pixels at each sample location are within a particular value range. As described above, a candidate data point is a reference data point that is an approximate match to the unknown data point, and because of the approximate matching, multiple candidate data points (related to different media segments) are identified for the unknown data point. The candidate determination engine 114 can return the candidate data points to the matching engine 112.

Figure 3:
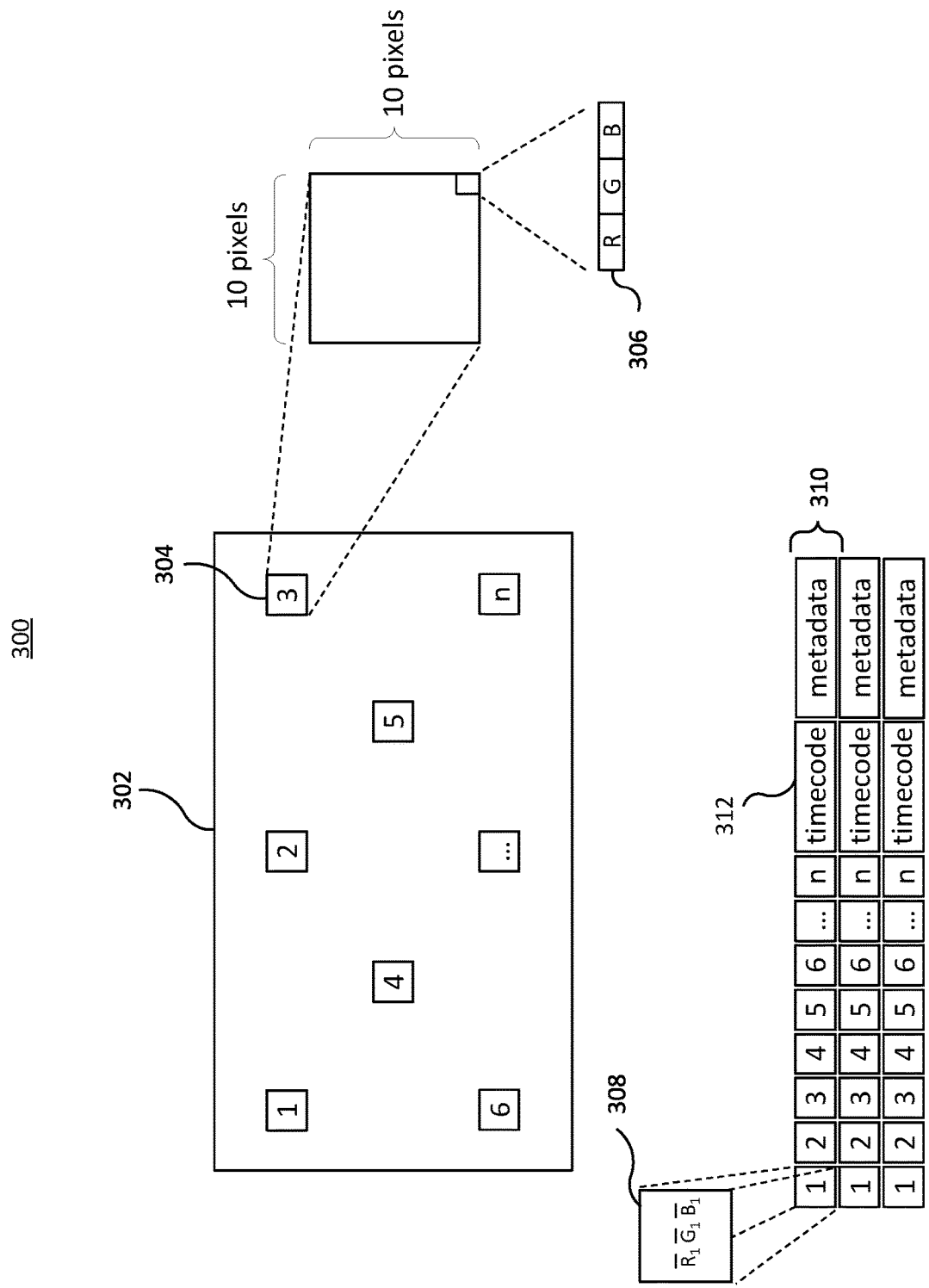
FIG. 3 is a block diagram of an example of a video capture system.

FIG. 3 illustrates an example of a video ingest capture system 400 including a memory buffer 302 of a decoder. The decoder can be part of the matching server 104 or the media client 106. The decoder may not operate with or require a physical television display panel or device. The decoder can decode and, when required, decrypt a digital video program into an uncompressed bitmap representation of a television program. For purposes of building a reference database of reference video data (e.g., reference database 316), the matching server 104 can acquire one or more arrays of video pixels, which are read from the video frame buffer. An array of video pixels is referred to as a video patch. A video patch can be any arbitrary shape or pattern but, for the purposes of this specific example, is described as a 10×10 pixel array, including ten pixels horizontally by ten pixels vertically. Also for the purpose of this example, it is assumed that there are 25 pixel-patch positions extracted from within the video frame buffer that are evenly distributed within the boundaries of the buffer.

An example allocation of pixel patches (e.g., pixel patch 304) is shown in FIG. 3. As noted above, a pixel patch can include an array of pixels, such as a 10×10 array. For example, the pixel patch 304 includes a 10×10 array of pixels. A pixel can include color values, such as a red, a green, and a blue value. For example, a pixel 306 is shown having Red-Green-Blue (RGB) color values. The color values for a pixel can be represented by an eight-bit binary value for each color. Other suitable color values that can be used to represent colors of a pixel include luma and chroma (Y, Cb, Cr) values or any other suitable color values.

A mean value (or an average value in some cases) of each pixel patch is taken, and a resulting data record is created and tagged with a time code (or time stamp). For example, a mean value is found for each 10×10 pixel patch array, in which case twenty-four bits of data per twenty-five display buffer locations are produced for a total of 600 bits of pixel information per frame. In one example, a mean of the pixel patch 304 is calculated, and is shown by pixel patch mean 308. In one illustrative example, the time code can include an "epoch time," which representing the total elapsed time (in fractions of a second) since midnight, Jan. 1, 1970. For example, the pixel patch mean 308 values are assembled with a time code 412. Epoch time is an accepted convention in computing systems, including, for example, Unix-based systems. Information about the video program, known as metadata, is appended to the data record. The metadata can include any information about a program, such as a program identifier, a program time, a program length, or any other information. The data record including the mean value of a pixel patch, the time code, and metadata, forms a "data point" (also referred to as a "cue"). The data point 310 is one example of a reference video data point.

Figure 4:
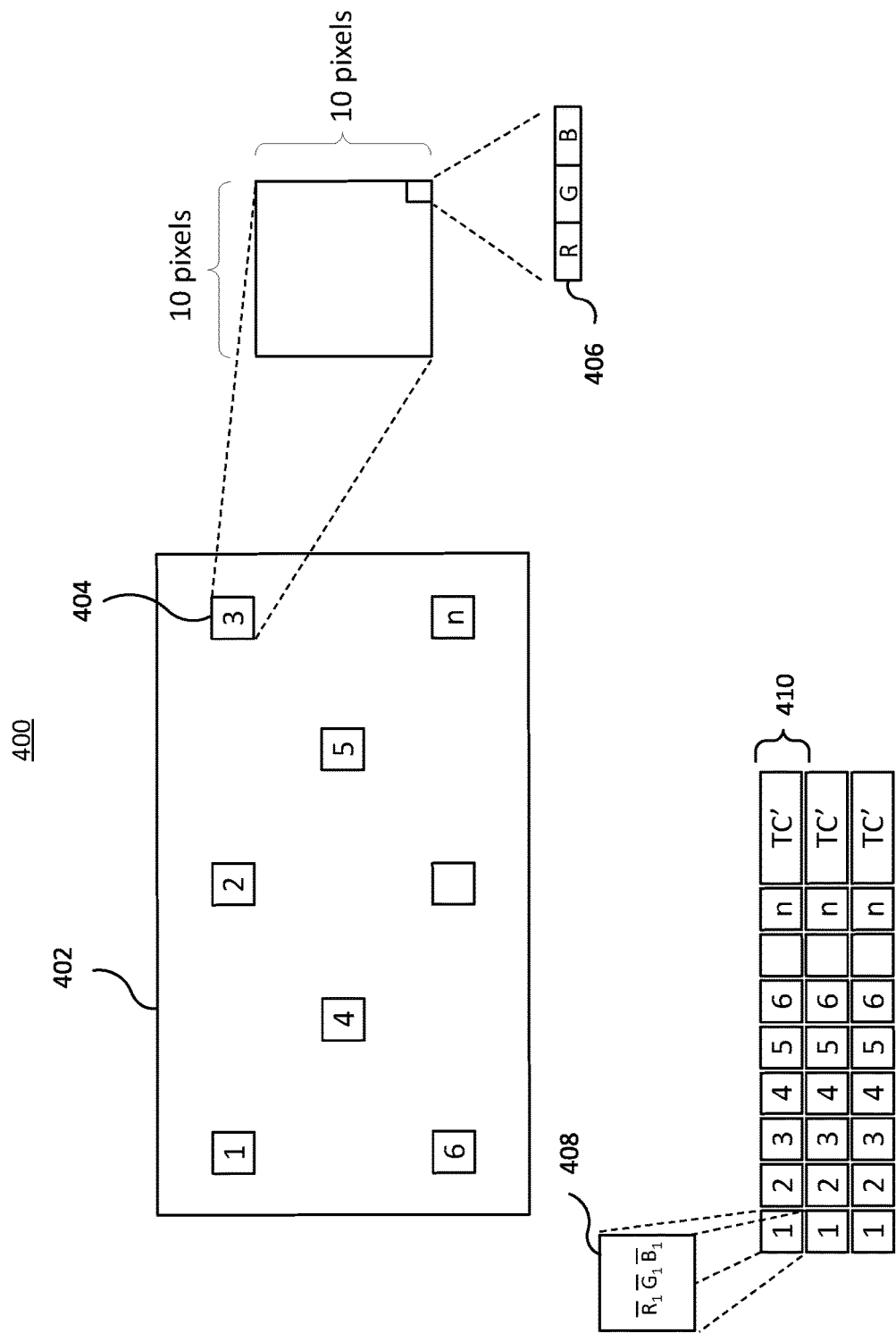
FIG. 4 is a block diagram of an example of a system for collecting video content presented by a display.

A process of identifying unknown video segments begins with steps similar to creating the reference database. For example, FIG. 4 illustrates a video ingest capture system 400 including a memory buffer 402 of a decoder. The video ingest capture system 400 can be part of the client device 102 that processes data presented by a display (e.g., on an Internet-connected television monitor, such as a smart TV, a mobile device, or other television viewing device). The video ingest capture system 400 can utilize a similar process to generate unknown video data point 410 as that used by system 300 for creating reference video data point 310. In one example, the media client 106 can transmit the unknown video data point 410 to the matching engine 112 to identify a video segment associated with the unknown video data point 410 by the matching server 104.

As shown in FIG. 4, a video patch 404 can include a 10×10 array of pixels. The video patch 404 can be extracted from a video frame being presented by a display. A plurality of such pixel patches can be extracted from the video frame. In one illustrative example, if twenty-five such pixel patches are extracted from the video frame, the result will be a point representing a position in a 75-dimension space. A mean (or average) value can be computed for each color value of the array (e.g., RGB color value, Y, Cr, Cb color values, or the like). A data record (e.g., unknown video data point 410) is formed from the mean pixel values and the current time is appended to the data. One or more unknown video data points can be sent to the matching server 104 to be matched with data from the reference database 116 using the techniques described above.

In some examples, cue data can be analyzed before it is sent to a matching server (e.g., matching server 104) to reduce an amount of data sent to the matching server and an amount of data stored remote from a media system (e.g., on the matching server or in a database associated with the matching server). In some examples, at least a portion of new cue data can be discarded according to a determination of whether the new cue data is sufficiently similar to previous cue data that has already been sent to the matching server. For example, one or more pixel data samples can be discarded from new cue data. In other examples, the methods herein for discarding pixel data samples can occur on the matching server, after the pixel data samples are received by the matching server.

Figure 5:
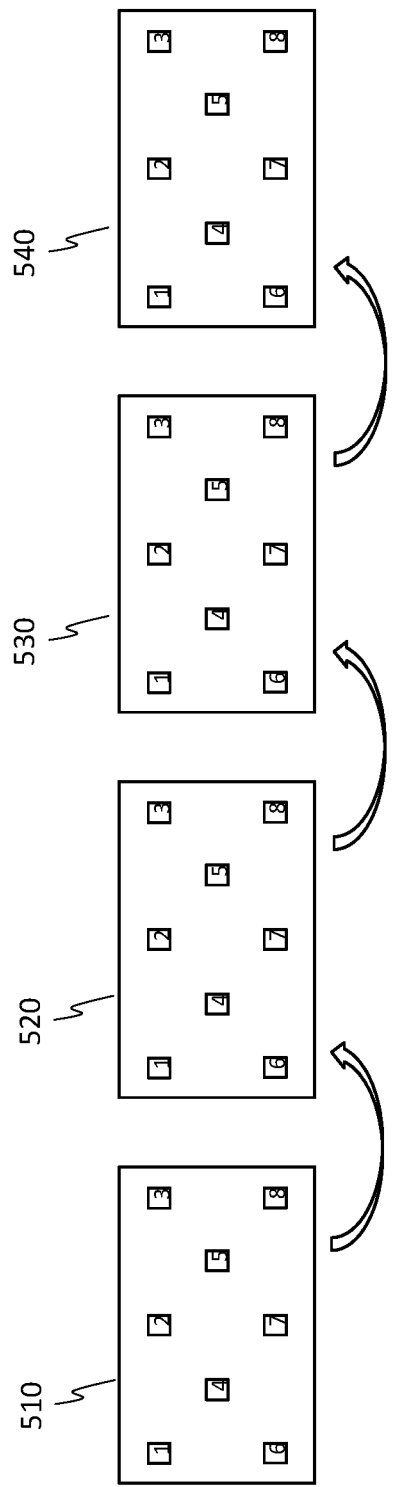
FIG. 5 illustrates an example of a sequence of frames that can be sent to a matching server.

FIG. 5 illustrates an example of a sequence of frames that can be sent to a matching server (e.g., matching server 104). The sequence of frames can include a first frame 510, a second frame 520, a third frame 530, and a fourth frame 540. A person of ordinary skill in the art will recognize that there can be more or less frames in the sequence of frames.

In some examples, the process of converting a frame of the sequence of frames into cue data can be similar to as discussed in FIG. 3. For example, one or more locations can be identified in a frame (e.g., location 1, location 2, location 3, location 4, location 5, location 6, location 7, and location 8). In some examples, a location can be a pixel patch, which can include an array of pixels (e.g., one or more pixels arranged in a format such as 10×10). In some examples, a pixel can include a red value, a green value, and a blue value (in a red-green-blue (RGB) color space). A person of ordinary skill in the art will recognize that other color spaces can be used. In some examples, the one or more pixels in the array of pixels can be summarized before sending to the matching server. For example, one or more pixels can each have a red value of the one or more pixels averaged to create an average red value for the one or more pixels. The one or more pixels can also each have a green value of the one or more pixels averaged to create an average green value for the one or more pixels. The one or more pixels can also each have a blue value of the one or more pixels averaged to create an average blue value for the one or more pixels. In some examples, the average red value, the average green value, and the average blue value for a pixel can be averaged together in a similar manner with other average red values, average green values, and average blue values for pixels in a pixel array to create a pixel data sample for a location. For example, a red average for one or more pixels can be 0, a green average for the one or more pixels can be 255, and a blue average for the one or more pixels can be 45. In such an example, the pixel data sample for the one or more pixels can be 0, 255, and 45, allowing the one or more pixels to be summarized using three numbers.

In other examples, the red value, the green value, and the blue value of a pixel can be averaged together to create an average pixel value for the pixel. The average pixel value for a pixel in a pixel array can be averaged together with the other average pixel values for other pixels in the pixel array to create a pixel data sample for a location. In such examples, one or more red values, one or more green values, and one or more blue values can be averaged together to create one number to summarize one or more pixels. In the example above, the one number to summarize the one or more pixels can be 100, the average of 0, 255, and 45.

In some examples, a pixel data sample can be computed for each location in a frame. The pixel data samples for the frame can then be combined to be sent to the matching server. In some examples, combining can include appending the numbers together to create one number. For example, 100, 25, and 55 can be combined to become 100025055. In other examples, a cue data object can be created with a variable for each location. In such examples, the cue data object can be sent to the matching server. In other examples, pixel data (e.g., a red value, a green value, and a blue value for a pixel) can be serialized with a bit map denoting whether locations (as described above) include values. For example, a location that includes values can include a "1" and a location that does not include values (e.g., the values are removed) can include a "0." A person of ordinary skill in the art will recognize that other methods for summarizing locations in a frame can be used.

Figure 6:
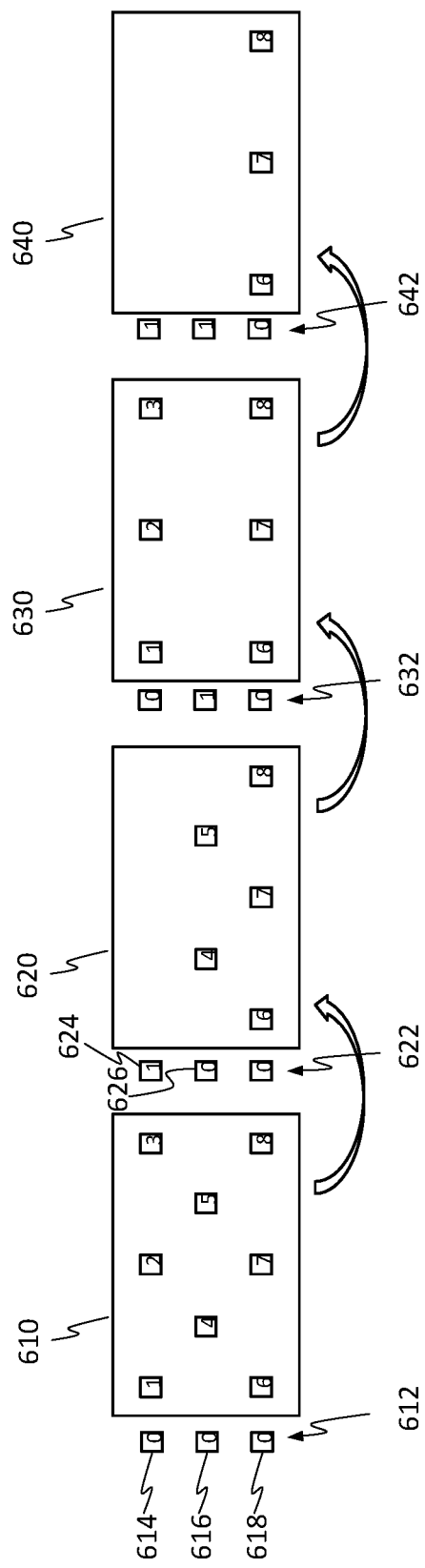
FIG. 6 illustrates an example of a sequence of frames with rows of pixel data samples removed.

FIG. 6 illustrates an example of a sequence of frames with rows of pixel data samples removed. By removing rows of pixel data samples, a size of the sequence of frames can be reduced, and an amount of memory required to store the sequence of frames can be reduced. A person of ordinary skill in the art will recognize that a single pixel data sample can be removed from cue data, rather than an entire row.

In some examples, a row of pixel data samples can be removed from cue data when one or more pixel data samples of the cue data are similar to previous cue data. In some examples, a pixel data sample can be similar to another pixel data sample when a difference between the two pixel data samples is within a pixel value range. The pixel value range can be preconfigured. For example, the pixel value range can be 5 values in a 0-255 value range (plus or minus). In such examples, a first pixel data sample is similar to a second pixel data sample when the first pixel data sample is within the 5 values of the second pixel data sample.

In one illustrative example, frame 610 can include all eight pixel data samples. However, frame 620 can include pixel data samples 4-8, and not 1-3. The pixel data samples 1-3 of frame 620 could have been removed because at least one pixel data sample of the pixel data samples 1-3 of frame 620 is similar to a corresponding pixel data sample of pixel data samples 1-3 of frame 610. In addition, frame 630 can include pixel data samples 1-3 and 6-8, but not pixel data samples 4-5. The pixel data samples 1-3 of frame 620 can be retained because the pixel data sample 1-3 of frame 630 are different than the pixel data samples 1-3 of frame 620. However, the pixel data samples 4-5 of frame 630 could have been removed because at least one pixel data sample of the pixel data samples 4-5 of frame 630 is similar to a corresponding pixel data sample of pixel data samples 4-5 of frame 620. In addition, frame 640 can include pixel data samples 6-8, but not pixel data samples 1-5. The pixel data samples 1-3 of frame 640 could have been removed because at least one pixel data sample of the pixel data samples 1-3 of frame 640 is similar to a corresponding pixel data sample of pixel data samples 1-3 of frame 630. The pixel data samples 4-5 of frame 640 could have been removed because at least one pixel data sample of the pixel data samples 4-5 of frame 640 is similar to a corresponding pixel data sample of pixel data samples 4-5 of frame 620 (comparing to frame 630 can be skipped because the pixel data samples 4-5 of frame 630 have been removed). In other examples, the media system can store the pixel data samples 4-5 of frame 630 so that the media system would not have to store pixel data samples from multiple frames. In such examples, frame 640 can be compared to frame 630 for all of the pixel data samples.

In some examples, one or more flags can be sent along with, or in addition to, cue data to the matching server. The one or more flags can indicate whether a row has been removed from a frame. For example, a "0" for a flag can indicate that a row has not been removed, and a "1" can indicate that a row has been removed. In other examples, a flag can be associated with each pixel data sample, indicating whether a particular pixel data sample was removed. A person of ordinary skill in the art will recognize that the one or more flags can be implemented in different ways, as long as the one or more flags indicate to the matching server which rows, or pixel data samples, have been removed.

FIG. 6 illustrates a flag for each row of a frame. Flags 612 are associated with frame 610. Flags 612 include a first flag 614, a second flag 616, and a third flag 618. The first flag 614 can be associated with a first row of pixel data samples of frame 610, which can include pixel data samples 1-3. The first flag 614 includes a "0," indicating pixel data samples 1-3 of frame 610 have not been removed. The second flag 616 can be associated with a second row of pixel data samples of frame 610, which can include pixel data samples 4-5. The second flag 616 includes a "0," indicating pixel data samples 4-5 of frame 610 have not been removed. The third flag 616 can be associated with a third row of pixel data samples of frame 610, which can include pixel data samples 6-8. The third flag 618 includes a "1," indicating pixel data samples 6-8 of frame 610 have not been removed.

Flags 622 are associated with frame 620. Flags 622 include a first flag 624, a second flag 626, and a third flag. The first flag 624 can be associated with a first row of pixel data samples of frame 620, which can include pixel data samples 1-3. The first flag 624 includes a "1," indicating pixel data samples 1-3 of frame 610 have been removed. The second flag 626 can be associated with a second row of pixel data samples of frame 620, which can include pixel data samples 4-5. The second flag 616 includes a "0," indicating pixel data samples 4-5 of frame 620 have not been removed.

In some examples, a flag can be received by the matching server. The matching server can determine what pixel data samples to use when performing an operation on cue data based on one or more flags associated with the cue data. For example, the matching server can determine to use cue data of frame 610 for pixel data samples 1-3 and cue data of frame 620 for pixel data samples 4-8 when performing an operation on the cue data of frame 620. In some examples, an operation can include matching cue data with reference data sets, as described above.

In cases where a previous frame (e.g., frame 630) has the same pixel data samples removed as a current frame (e.g., frame 640), the matching server can use a frame previous to the previous frame (e.g., frame 620). For example, when performing an operation on frame 640, the matching server can use pixel data samples 1-3 of frame 630, pixel data samples 4-5 of frame 620, and pixel data samples 6-8 of frame 640.

In some examples, no indication (e.g., a flag) of an absence of a pixel data sample might be sent to the matching server. By not sending an indication of a missing pixel data sample, the media system can send less data to the matching server. In such examples, the matching server can detect the absence of the pixel data sample. One method for determining the absence of the pixel data sample is identifying whether a portion of cue data is missing. For example, when cue data is an object with a variable for each of the locations, the matching server can identify a missing pixel data sample when a variable does not include a value (or includes a null value, a negative value, or some other indication that a pixel data sample has not been included). When cue data is a non-object format, a field separator can be used, such as a comma, space, or other character. Intended missing data can be conveyed by not including one or more values between two field separators. Upon detection of a missing pixel data sample, the matching server can substitute the last non-similar pixel data sample from one or more previous frames.

By removing pixel data samples from frames, an overall storage load of the matching server can also be reduced. An example of how this could occur would be a video segment including a blue sky that does not change for many frames. The pixel data samples associated with the blue sky for the many frames can be removed from the cue data and not sent to nor stored by the matching server. Another example of redundant data can be found in news, sports, or entertainment interview programming where only a portion of the frame is moving (e.g., a person talking). The portions of the frame not moving can be removed from the cue data and not sent to nor stored by the matching server.

Figure 7:
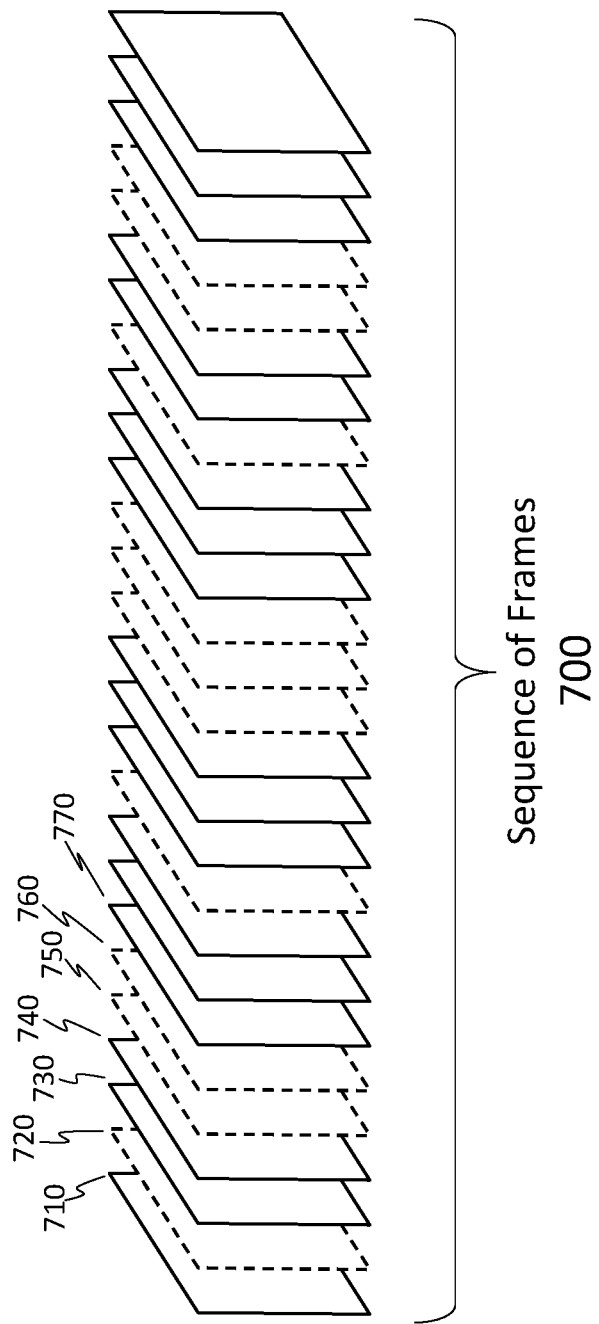
FIG. 7 illustrates an example of a sequence of frames with frames not sent to a matching server.

FIG. 7 illustrates an example of a sequence of frames 700 with frames not sent to a matching server (e.g., matching server 104). In some examples, a media system can determine to not send a frame to the matching server when the frame is sufficiently similar to a previous frame. In other examples, the media system can determine to not send the frame to the matching server when it is a particular time of the day. In such examples, a lower frame rate can be sufficient for monitoring viewing statistics.

In some examples, sufficiently similar can be determined by comparing one or more current pixel data samples of a current frame to one or more previous pixel data samples of a previous frame, as discussed above. In some examples, the one or more current pixel data samples of a current frame can be compared to any previous pixel data sample for similar pixel data samples. The media system can compare the number of current pixel data samples of a current frame that match previous pixel data samples of a previous frame. In some implementations, if the number exceeds a threshold, the media system can determine to not send the current frame to the matching server. In some examples, the threshold can be a percentage of the pixel data samples (e.g., 80%, 90%, or some other percentage indicating that the media system is sufficiently confident that the current frame and the previous frame are sufficiently similar). A person of ordinary skill in the art will recognize that the threshold can be a different format (e.g., a minimum number of similar pixel data samples, a number of pixel data samples on each row that are similar, or some other measure that indicates similarity between a frame to another frame).

To illustrate an example where frames are not sent, the sequence of frames 700 includes several frames (e.g., a first frame 710, a second frame 720, a third frame 730, a fourth frame 740, a fifth frame 750, a sixth frame 760, and a seventh frame 770). A frame including solid lines can indicate that the frame is sent from the media system to the matching server. A frame including dotted lines can indicate that the frame is not sent from the media system to the matching server. The first frame 710 includes solid lines, indicating the first frame 710 is sent to the matching server. The first frame 710 can be sent to the matching server because the first frame 710 does not have a previous frame to match to. The media system can determine that the second frame 720, on the other hand, should not be sent to the matching server because the second frame 720 is sufficiently similar to the first frame 710.

The third frame 730 can be sent to the matching server, indicating that the third frame is sufficiently different from the second frame 720 to require the third frame 730 to be sent to the matching server.

In some examples, when a frame is not sent to the matching server, the media system might not store the frame. In such examples, a comparison with a current frame and a previous frame can skip any frames that were not sent to the matching server. For example, the seventh frame 770 can be compared with the fourth frame 740 because both of the fifth frame 750 and the sixth frame 760 were not sent to the matching server. In such examples, only a previous frame sent to the matching server may be stored by the media system.

In other embodiments, the media system might only store a previous frame that was converted into cue data, whether the cue data was sent to the matching server or not. In such examples, a comparison with a current frame and a previous frame can be made to frames that were not sent to the matching server. For example, the seventh frame 770 can be compared with the sixth frame 760, even though the sixth frame 760 was not sent to the matching server.

An example of similar frames can be found in, but is not limited to, news, sports, or entertainment interview programming, where only a sound component of the frame is changing (e.g., a fixed picture). In such an example, the media system can determine that a particular number of consecutive frames have not been sent to the matching system. Upon determining that the particular number of consecutive frames have not been sent, the media system can determine to send other information to the matching server for identification of frames being displayed on the media system (e.g., audio portions of the frames can be sent rather than video portions). In such examples, the matching server can identify a video segment being displayed on the media system using one or more audio portions rather than one or more video portions (e.g., pixels in one or more frames).

In examples where a frame is not sent to the matching server, the media system may send a flag indicating that the frame was not sent. In other embodiments, a flag can be included with frames that are sent to the matching server, indicating a frame number so that the matching server can determine when frames were not sent. In other embodiments, no flag may be sent to the matching server. In such embodiments, the matching server can continue matching frames to a video segment without any knowledge of a missing frame. Methods of matching herein allow the matching server to still identify the video segment when one or more frames are not sent to the matching server.

Figure 8:
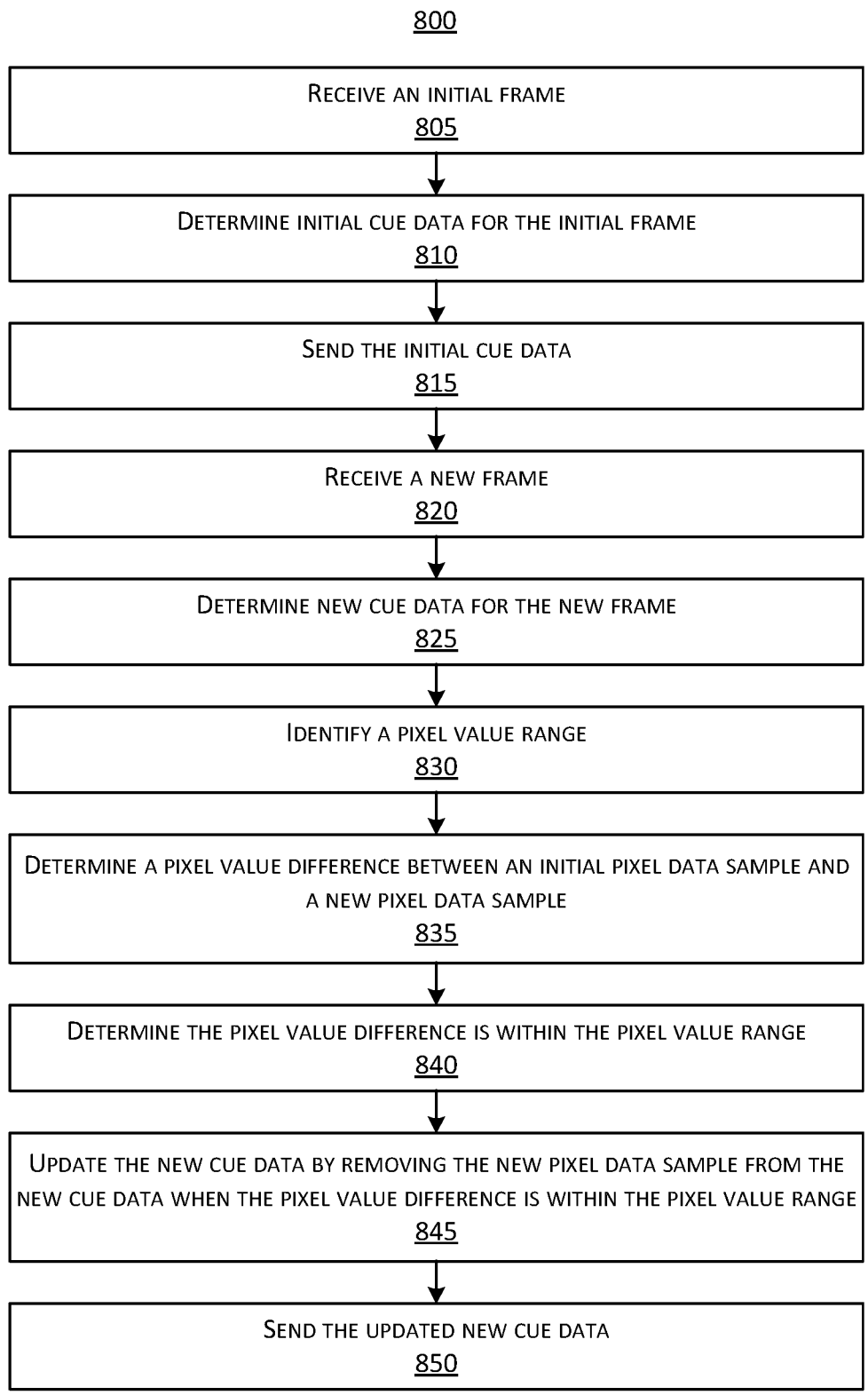
FIG. 8 is a flowchart illustrating an example of a process for discarding pixel data samples from cue data of a frame.

FIG. 8 is a flowchart illustrating an example of a process 800 for discarding pixel data samples from cue data of a frame. In some examples, the process 800 can be performed by a media system. Process 800 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 805, the process 800 includes receiving an initial frame. In some examples, the initial frame can be associated with a first video segment. In such examples, the media system can be unaware of an identification of the first video segment. The media system can receive the initial frame from a remote source, including a broadcast provider or a server on a network (e.g., Internet). In some examples, the initial frame can include pixel data. The pixel data can include pixels that allow the frame to be displayed. In some examples, a pixel can include one or more pixel values (e.g., a red value, a green value, and a blue value in a red-green-blue (RGB) color space).

At step 810, the process 800 includes determining initial cue data for the initial frame. The initial cue data can include a plurality of initial pixel data samples associated with the initial frame. In some examples, an initial pixel data sample can be determined for each of one or more locations (e.g., a pixel patch) of the initial frame. In some examples, an initial pixel data sample can be computed for a location by summarizing (e.g., taking an average) one or more pixels included in the location. The one or more pixels can be an array of pixels (e.g., 10×10). In some examples, a red value, a green value, and a blue value of the one or more pixels can be summarized separately. In other examples, the red value, the green value, and the blue value of the one or more pixels can be summarized together to create one number for the location.

At step 815, the process 800 includes sending the initial cue data. The initial cue data can be sent to a server (e.g., a matching server) by addressing the initial cue data to the server. The server can attempt to match the initial cue data with a first reference data set. Matching can occur by comparing the initial cue data with other cue data (e.g., the first reference data set).

At step 820, the process 800 includes receiving a new frame. In some examples, the new frame can include pixel data, and be received after the initial frame. The new frame can be associated with a second video segment. In some examples, the second video segment can be the same as the first video segment. For example, the media system can receive two frames from the same video segment. In other examples, the second video segment can be different than the first video segment. For example, a transition between the first video segment and the second video segment can occur between receiving the initial frame and the new frame.

At step 825, the process 800 includes determining new cue data for the new frame. The new cue data can include a plurality of new pixel data samples associated with the new frame. The new cue data can be determined similar to as discussed above for the initial cue data.

At step 830, the process 800 includes identifying a pixel value range. In some examples, the pixel value range can be a number of pixel values. In some examples, pixel data samples are determined to be similar when a pixel value difference between the pixel data samples is within the pixel value range. For example, the pixel value range can be 5 values. In such an example, a first pixel data sample would be within the pixel value range of a second pixel data sample when the second pixel data sample is either within plus or minus 5 values of the first pixel data sample.

At step 835, the process 800 includes determining a pixel value range difference between an initial pixel data sample and a new pixel data sample. In some examples, the initial pixel data sample can correspond to the new pixel data sample. For example, if the initial pixel data sample is associated with the location 1 of the first frame 510 of FIG. 5, a pixel data sample associated with a location 1 of the second frame 520 would correspond with the initial pixel data sample.

At step 840, the process 800 includes determining the pixel value difference is within the pixel value range. In some examples, the pixel value difference can be determined to be within the pixel value range by comparing the pixel value difference with the pixel value range to identify whether the pixel value difference is less than the pixel value range.

At step 845, the process 800 includes updating the new cue data by removing the new pixel data sample from the new cue data when the pixel value difference is within the pixel value range. In some examples, removing the new pixel data sample from the new cue data can include removing a row of pixel data samples from the new cue data. In such examples, the new pixel data sample can be included in the row of pixel data samples. In other examples, only the new pixel data sample can be removed from the new cue data, rather than the entire row.

At step 850, the process 800 includes sending the updated new cue data. The updated new cue data can be sent to the server by addressing the updated new cue data to the server. The server can attempt to match the updated new cue data with a second reference data set. Matching can occur by comparing the new updated cue data with other cue data (e.g., the second reference data set). In some examples, when comparing the new updated cue data to other cue data, the matching server can use pixel data samples from cue data received prior to the updated new cue data to replace the removed pixel data sample. In such examples, the matching server can use a pixel data sample of a previous frame corresponding to the removed pixel data sample.

In some examples, the process 800 can further include sending a flag indicating that the new pixel data sample is removed from the new cue data. In other examples, the process 800 can further include sending a flag indicating that a row of pixel data samples are removed from the new cue data. In such examples, the new pixel data sample can be included in the row. In either set of examples, the flag can be sent to the server by addressing the flag to the server.

Figure 9:
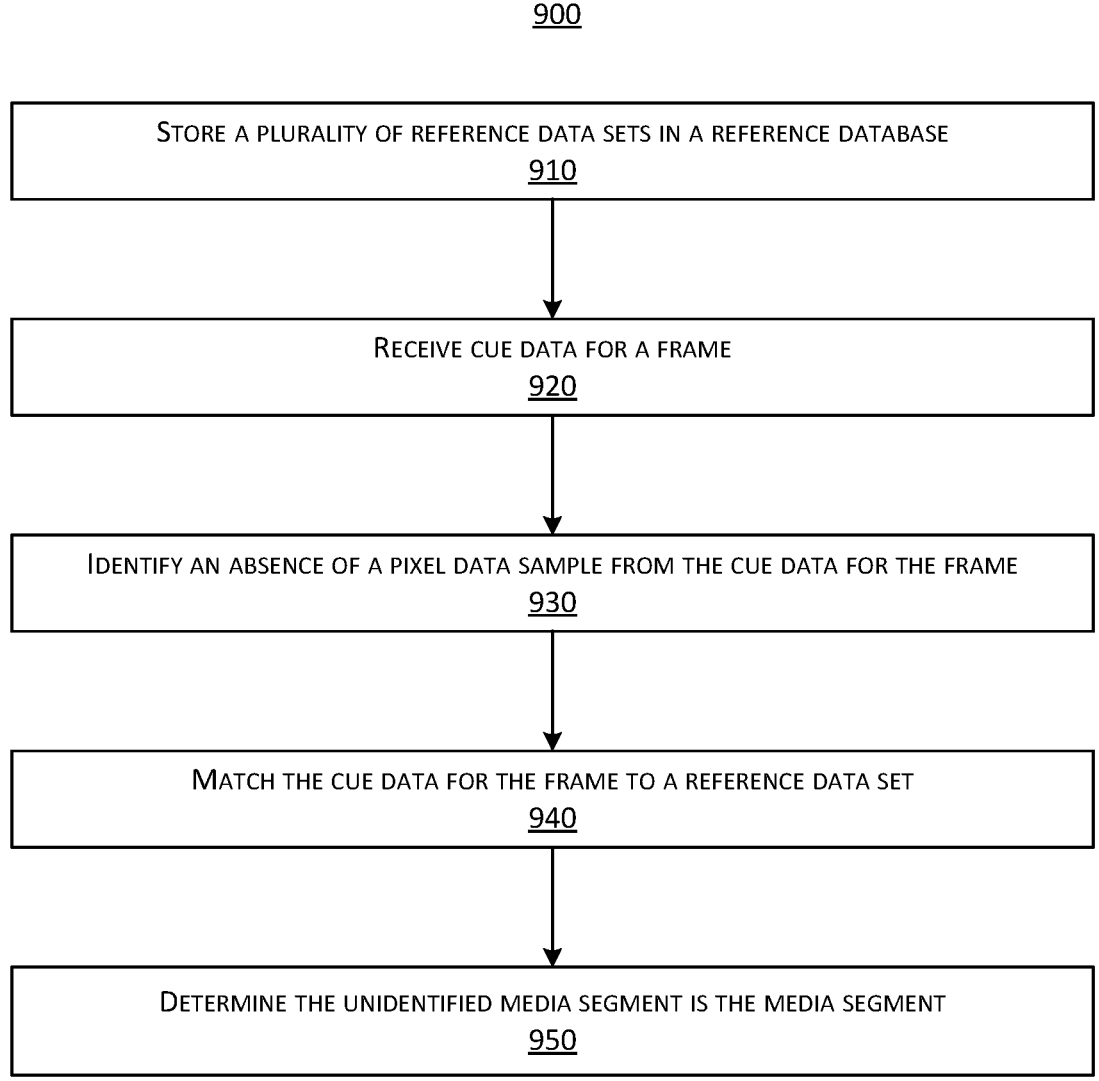
FIG. 9 is a flowchart illustrating an example of a process for determining an unidentified media segment using initial frame data to supplement new frame data.

FIG. 9 is a flowchart illustrating an example of a process 900 for determining an unidentified media segment using initial frame data to supplement new frame data. In some examples, the process 800 can be performed by a media system. Process 900 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 910, the process 900 includes storing a plurality of reference data sets in a reference database. In some examples, a reference data set can be associated with a media segment. In some examples, a reference data set can correspond to cue data (e.g., the reference data set can be determined similarly to the cue data such that the reference data set can be matched to the cue data).

At step 920, the process 900 includes receiving cue data for a frame. The cue data can be received from a server (e.g., a matching server). In some examples, the cue data can include a plurality of pixel data samples that are associated with the frame. The frame can be associated with a first unidentified media segment.

At step 930, the process 900 includes identifying an absence of a pixel data sample from the cue data for the frame. In some examples, identifying the absence of the pixel data sample includes analyzing the cue data for a missing pixel data sample, as described above.

In other examples, the process 900 can identify an absence of the pixel data sample through the following steps. The matching server can identify a previous cue data and determine that the previous cue data includes the previous pixel data sample, as described above. The previous cue data can be received before the cue data. In other examples, the matching server can identify the previous cue data, determine that the previous pixel data sample is not absent from the previous cue data, and determine to use the previous pixel data sample for matching the cue data for the frame of the reference data set, as described above.

At step 940, the process 900 includes matching the cue data for the frame to a reference data set. The reference data set can be associated with a media segment. In some examples, the matching can include using the previous pixel data sample of a previous cue data. The previous cue data can be from a previous frame. In some examples, the previous pixel data sample corresponds to the pixel data sample absent from the frame.

At step 950, the process 900 includes determining the unidentified media segment is the media segment. The unidentified media segment can be identified as the media segment when a bin associated with the media segment reaches a threshold, as discussed above.

In some examples, the process 900 can further include receiving a flag indicating that the pixel data sample is absent from the cue data. The absence of the pixel data sample can be identified using the flag. In other examples, the process 900 can further include receiving a flag indicating that a row of pixel data samples is absent from the cue data. In such examples, the pixel data sample can be included in the row.

In some examples, the process 900 can further include identifying intermediate cue data from an intermediate frame. The intermediate cue data can include a plurality of pixel data samples from an intermediate frame. In some examples, the intermediate frame can be associated with a first unidentified media segment. In such examples, the process 900 can further include identifying an absence of an intermediate pixel data sample from the intermediate cue data for the intermediate frame.

In such examples, the process 900 can further include identifying the previous cue data from the previous frame. The previous cue data can include a plurality of pixel data samples from the previous frame. In some examples, the previous frame can be associated with a second unidentified media segment. In some examples, the second unidentified video segment can be the same as the first unidentified video segment. For example, the media system can receive two frames from the same unidentified video segment and send both to the matching server. In other examples, the second unidentified video segment can be different than the first unidentified video segment. For example, a transition between the first unidentified video segment and the second unidentified video segment can occur between receiving the initial frame and the new frame.

As discussed above, a video matching system can be configured to identify a media content stream when the media content stream includes an unidentified media segment. As further discussed above, identifying the media content stream may include identifying media content presented by a media display device before or after the unidentified media segment. Processes for identifying media content are discussed above with respect to FIG. 1. Specifically, the video content system may use samples taken from the display mechanism of the media content device (e.g., graphic and/or audio samples) and generate cues from these samples. The video matching system may then match the cues against a reference database, where the database contains cues of known content.

The video matching system may further include various methods to improve the efficiency of finding potential matches, or "candidates" in the database. The database may contain an enormous number of cues, and thus the video matching system may include algorithms for finding candidate cues to match against cues generated from the media content device's display mechanism. Locating candidate cues may be more efficient than other methods for matching cue values against the values in the database, such as matching a cue against every entry in the database.

Nearest neighbor and path pursuit are examples of techniques that can be used to locate candidate queues in the reference database. Below, an example of tracking video transmission using ambiguous cues is given, but the general concept can be applied to any field where match candidates are to be selected from a reference database.

A method for efficient video pursuit is presented. Given a large number of video segments, the system must be able to identify in real time what segment a given query video input is taken from and in what time offset. The segment and offset together are referred to as the location. The method is called video pursuit since it must be able to efficiently detect and adapt to pausing, fast forwarding, rewinding, abrupt switching to other segments and switching to unknown segments. Before being able to pursue live video the database is processed. Visual cues (a handful of pixel values) are taken from frames every constant fraction of a second and put in specialized data structure (note that this can also be done in real time). The video pursuit is performed by continuously receiving cues from the input video and updating a set of beliefs or estimates about its current location. Each cue either agrees or disagrees with the estimates, and they are adjusted to reflect the new evidence. A video location is assumed to be the correct one if the confidence in this being true is high enough. By tracking only a small set of possible "suspect" locations, this can be done efficiently.

A method is described for video pursuit but uses mathematical constructs to explain and investigate it. It is the aim of this introduction to give the reader the necessary tools to translate between the two domains. A video signal is comprised of sequential frames. Each can be thought of as a still image. Every frame is a raster of pixels. Each pixel is made out of three intensity values corresponding to the red, green, and blue (RGB) make of that pixel's color. In the terminology used herein, a cue is a list of RGB values of a subset of the pixels in a frame and a corresponding time stamp. The number of pixels in a cue is significantly smaller than in a frame, usually between 5 and 15. Being an ordered list of scalar values, the cue values are in fact a vector. This vector is also referred to as a point.

Although these points are in high dimension, usually between 15 and 150, they can be imagined as points in two dimensions. In fact, the illustrations will be given as two dimensional plots. Now, consider the progression of a video and its corresponding cue points. Usually a small change in time produces a small change in pixel values. The pixel point can be viewed as "moving" a little between frames. Following these tiny movements from frame to frame, the cue follows a path in space like a bead would on a bent wire.

In the language of this analogy, in video pursuit the locations of the bead in space (the cue points) are received and the part of wire (path) the bead is following is looked for. This is made significantly harder by two facts. First, the bead does not follow the wire exactly but rather keeps some varying unknown distance from it. Second, the wires are all tangled together. These statements are made exact in section 2. The algorithm described below does this in two conceptual steps. When a cue is received, the algorithm looks for all points on all the known paths that are sufficiently close to the cue point; these are called suspects. This is done efficiently using the Probabilistic Point Location in Equal Balls algorithm. These suspects are added to a history data structure and the probability of each of them indicating the true location is calculated. This step also includes removing suspect locations that are sufficiently unlikely. This history update process ensures that on the one hand only a small history is kept but on the other hand no probable locations are ever deleted. The generic algorithm is given in Algorithm 1 and illustrated in FIG. 10.

---

Algorithm 1 Generic path pursuit algorithm.

1:   Set of suspects is empty
2:   loop
3:      Receive latest cue.
4:      Find path points who are close to it.
5:      Add them to the set of suspects.
6:      Based on the suspects update the location likelihood function.
7:      Remove from suspect set those who do not contribute to the likelihood function.
8:      if A location is significantly likely then
9:          Output the likely location.
10:     end if
11:  end loop

---

The following sections begin with describing the Probabilistic Point Location in Equal Balls (PPLEB) algorithm in Section 1. The PPLEB algorithm is used in order to perform line 5 in Algorithm 1 above efficiently. The ability to perform this search for suspects quickly is crucial for the applicability of this method. In section 2 one possible statistical model is described for performing lines 6 and 7. The described model is a natural choice for the setup. It is also shown how it can be used very efficiently.

Section 1—Probabilistic Point Location in Equal Balls

The following section describes a simple algorithm for performing probabilistic point location in equal balls (PPLEB). In the traditional PLEB (point location in equal balls), one starts with a set of n points $x_i$ in $1R^d$ and a specified ball of radius r. The algorithm is given O(poly(n)) preprocessing time to produce an efficient data structure. Then, given a query point x the algorithm is required to return all points $x_i$ such that $\|x-x_i\| \leq r$. The set of points such that $\|x-x_i\| \leq r$. geometrically lie within a ball of radius r surrounding the query x. This relation is referred to as x, being close to $x_i$ or as x, and $x_i$ being neighbors.

The problem of PPLEB and the problem of nearest neighbor search are two similar problems that received much attention in the academic community. In fact, these problems were among the first studied in the field of computational geometry. Many different methods cater to the case where the ambient dimension is small or constant. These partition the space in different ways and recursively search through the parts. These methods include KD-trees, cover-trees, and others. Although very efficient in low dimension, when the ambient dimension is high, they tend to perform very poorly. This is known as the "curse of dimensionality". Various approaches attempt to solve this problem while overcoming the curse of dimensionality. The algorithm used herein uses a simpler and faster version of the algorithm and can rely on Local Sensitive Hashing.

Section 1.1 Locality Sensitive Hashing

In the scheme of local sensitive hashing, one devises a family of hash functions H such that:

$$\Pr_{u \sim U}(u(x) \neq u(y) \mid \|x-y\| \leq r) \equiv p$$

$$\Pr_{u \sim U}(u(x) \neq u(y) \mid \|x-y\| \geq 2r) \geq 2p$$

In words, the probability of x and y being mapped to the same value by h is significantly higher if they are close to each other.

For the sake of clarity, let us first deal with a simplified scenario where all incoming vectors are of the same length r' and r'>$\sqrt{2}$r. The reason for the latter condition will become clear later. First a random function u∈U is defined, which separates between x and y according to the angle between them. Let $\vec{u}$ be a random vector chosen uniformly from the unit sphere $S^{d-1}$ and let u(x)=sign ($\vec{u}$·x). It is easy to verify that $Pr_{u \sim U}(u(x) \neq u(y)) = \theta_{x,y}/\pi$. Moreover, for any points x, y, x', y' on a circle such that $$\Pr_{u \sim U}(u(x) \neq u(y) \mid \|x - y\| \leq r) \equiv p$$

$$\Pr_{u \sim U}(u(x) \neq u(y) \mid \|x - y\| \geq 2r) \geq 2p$$

The family of functions H is set to be a cross product of t independent copies of u, i.e. $h(x) = [u1(x), \ldots, u_t(x)]$. Intuitively, one would like to have that if h(x)=h(y) then x and y are likely to be close to each other. Let us quantify that. First, compute the expected number of false positive mistakes $n_{fp}$. These are the cases for which h(x)=h(y) but ‖x−y‖>2r. A value t is found for which $n_{fp}$ is no more than 1, i.e. one is not expected to be wrong.

$$E[n_{f,i}] \leq n(1-2p)^t \leq 1$$

$$\rightarrow t \geq \log(1/n)/\log(1-2p)$$

Now, the probability that h(x)=h(y) given that they are neighbors is computed:

$$Pr(h(x) = h(y) \mid \|x - y\| \leq r) \geq (1 - p)^{\log(1/n)/\log(1-2p)} =$$

$$(1/n)^{\log(1-p)/\log(1-2p)} \geq 1/\sqrt{n}.$$

Note here that one must have that 2p<1 which requires r'>$\sqrt{2}$r. This might not sound like a very high success probability. Indeed, $1/\sqrt{n}$ is significantly smaller than ½. The next section will describe how to boost this probability up to ½.

Section 1.2 The Point Search Algorithm

Each function h maps every point in space to a bucket. Define the bucket function $B_h: \mathbb{R}^d \rightarrow 2^{[n]}$ of a point x with respect to hash function h as $B_h(x) \equiv \{x_i | h(x_i) = h(x)\}$. The data structure maintained is m=O($\sqrt{n}$) instances of bucket functions $[Bh_1, \ldots, Bh_m]$. When one searches for a point x, the function returns $B(x) = \cup_i B_{h_j}(x)$. According to the previous section, there are two desired results:

$$Pr(x_i \in B(x) \mid \|x_i - x\| \leq r) \geq \frac{1}{2}$$

$$E[|B(x) \cap \{x_i | \|x - x_i\| > 2r\}|] \leq \sqrt{n}.$$

In other words, while with probability at least ½ each neighbor of x is found, one is not likely to find many non-neighbors.

Section 1.3 Dealing with Different Radii Input Vectors

Figure 13:
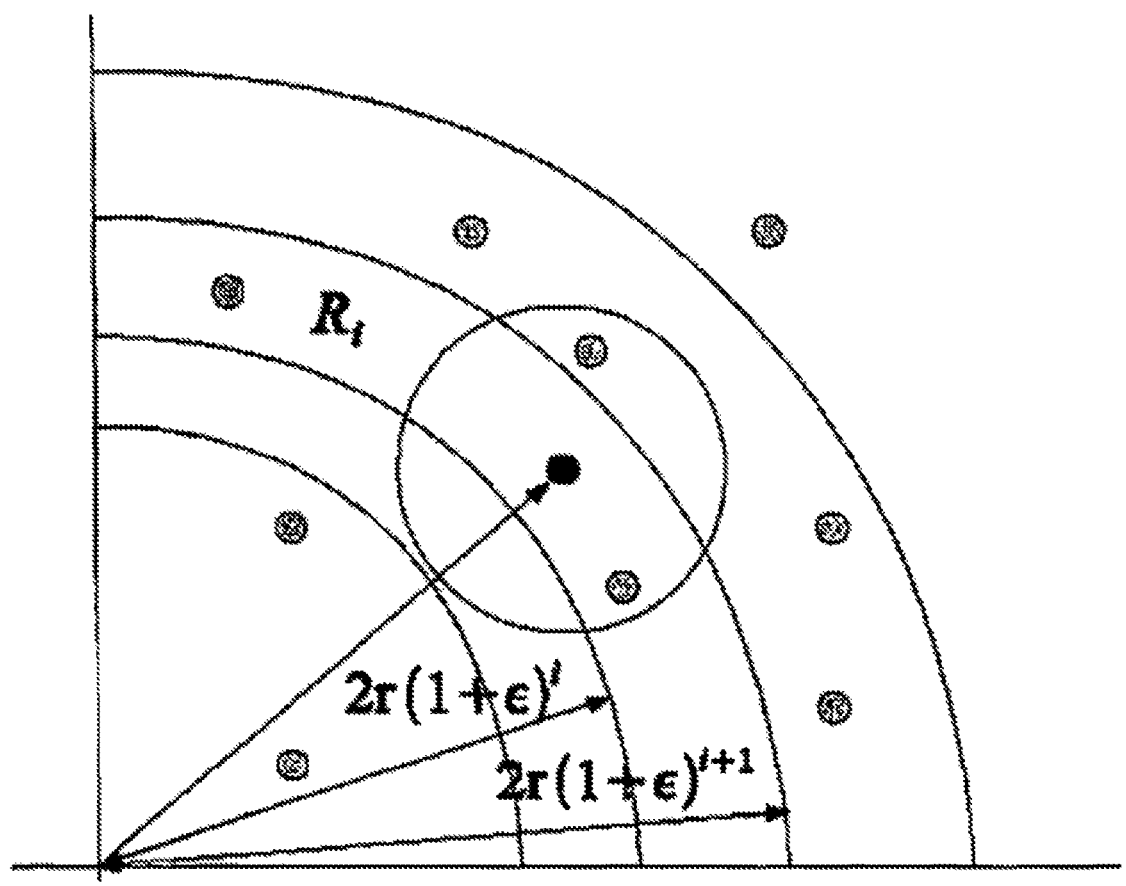
FIG. 13 is a chart illustrating a space divided into rings of exponentially growing width.

The previous sections only dealt with searching through vectors of the same length, namely r'. Now described is how one can use the construction as a building block to support a search in different radii. As seen in FIG. 13, the space is divided into rings of exponentially growing width. Ring i, denoted by $R_i$, includes all points $x_i$ such that $\|x_i\| \in [2r(1+\in)^i, 2r(1+\in)^{i+1}]$. Doing this achieves two ends. First, if $x_i$ and $x_j$ belong to the same ring, then $\|x_j\|/(1+\in) \leq \|x_i\| \leq \|x_j\|(1+\in)$. Second, any search can be performed in at most 1/∈ such rings. Moreover, if the maximal length vector in the data set is r' then the total number of rings in the system is O(log (r'/r)).

Section 2 The Path Pursuit Problem

In the path pursuit problem, a fixed path in space is given along with the positions of a particle in a sequence of time points. The terms particle, cue, and point will be used interchangeably. The algorithm is required to output the position of the particle on the path. This is made harder by a few factors: the particle only follows the path approximately; the path can be discontinuous and intersect itself many times; both particle and path positions are given in a sequence of time points (different for each).

It is important to note that this problem can simulate tracking a particle on any number of paths. This is simply done by concatenating the paths into one long path and interpreting the resulting position as the position on the individual paths.

Figure 14:
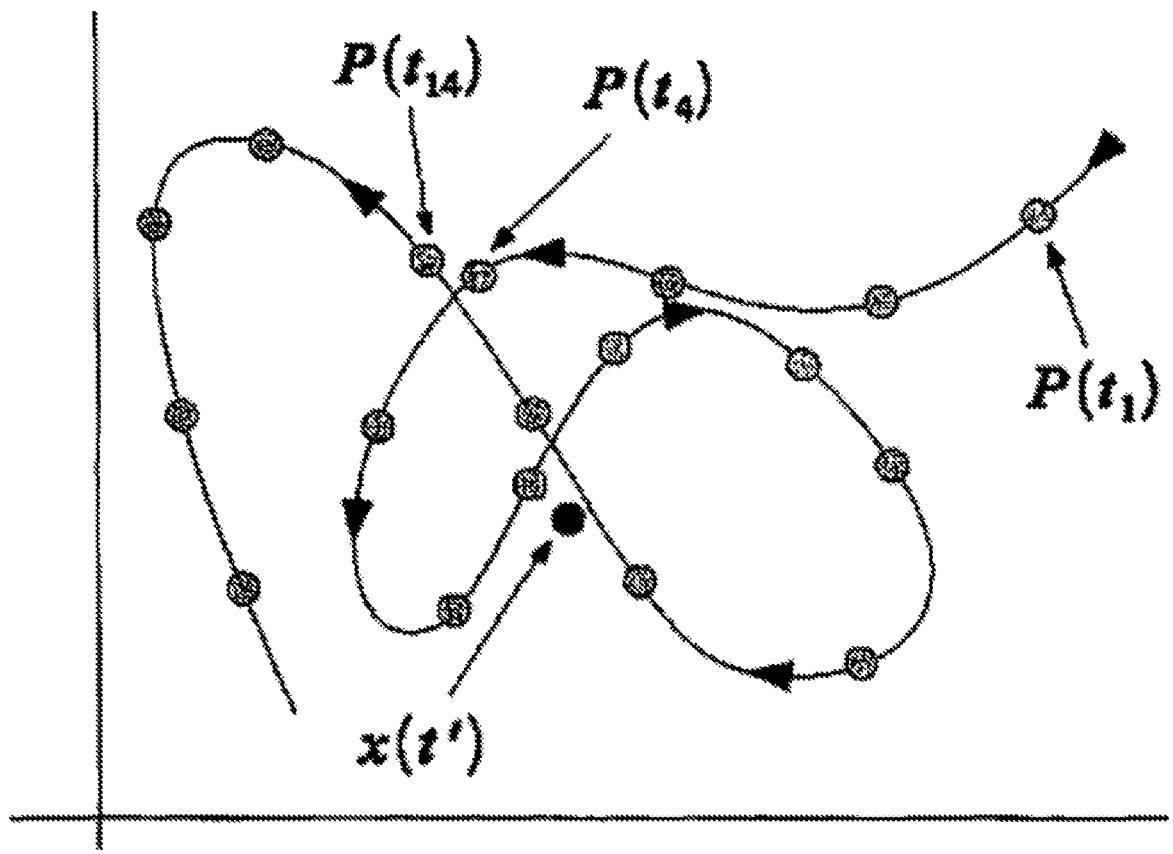
FIG. 14 is a chart illustrating self-intersecting paths and a query point.

More precisely, let path P be parametric curve P:$\mathbb{R} \rightarrow \mathbb{R}^d$. The curve parameter will be referred to as the time. The points on the path that are known to us are given in arbitrary time points $t_i$, i.e. n pairs ($t_i$, $P(t_i)$) are given. The particle follows the path but its positions are given in different time points, as shown in FIG. 14. Further, m pairs (t'$_j$, x(t'$_j$)) are given, where x(t'$_j$) is the position of the particle in time t'$_j$.

Section 2.1 Likelihood Estimation

Since the particle does not follow the path exactly and since the path can intersect itself many times it is usually impossible to positively identify the position on the path the particle is actually on. Therefore, a probability distribution is computed on all possible path locations. If a location probability is significantly probable, the particle position is assumed to be known. The following section describes how this can be done efficiently.

If the particle is following the path, then the time difference between the particle time stamp and the offset of the corresponding points on P should be relatively fixed. In other words, if x(t') is currently in offset t on the path then it should be close to P(t). Also, τ seconds ago it should have been in offset t−τ. Thus x(t'−τ) should be close to P(t−τ) (note that if the particle is intersecting the path, and x(t') is close to P(t) temporarily, it is unlikely that x(t'−τ) and P(t−τ) will also be close). Define the relative offset as Δ=t−t'. Notice that as long as the particle is following the path the relative offset Δ remains unchanged. Namely, x(t') is close to P(t'+Δ).

The maximum likelihood relative offset is obtained by calculating:

$$\Delta = \underset{\delta}{\mathrm{argmax}} Pr(x(t'_m), x(t'_{m-1}), \ldots, x(t'_1) \mid P, \delta)$$

In words, the most likely relative offset is the one for which the history of the particle is most likely. This equation however cannot be solved without a statistical model. This model must quantify: how tightly x follows the path; how likely it is that x jumps between locations; and how smooth the path and particle curves are between the measured points.

Section 2.2 Time Discounted Binning

Now described is a statistical model for estimating the likelihood function. The model makes the assumption that the particle's deviation away from the path distributes normally with standard deviation ar. It also assumes that at any given point in time, there is some non-zero probability the particle will abruptly switch to another path. This is manifested by an exponential discount with time for past points. Apart for being a reasonable choice for a modeling point of view this model also has the advantage of being efficiently updateable. For some constant time unit 1, set the likelihood function to be proportional to $f$ which is defined as follows:

$$f_m(\lfloor \delta/\tau \rfloor) = \sum_{j=1}^{m}\sum_{i=1}^{n} e^{-\left(\frac{[|x(t'_j)-P(t_i+\delta)|]}{\alpha r}\right)^2}(1-\zeta)^{t'_i-t'_j}.$$

Here $\alpha \ll 1$ is a scale coefficient and $\zeta > 0$ is the probability that the particle will jump to a random location on the path in a given time unit.

Updating the function $f$ efficiently can be achieved using the following simple observation.

$$f_m(\lfloor \delta/\tau \rfloor) = \sum_{i=1}^{n} e^{-\left(\frac{[|x(t'_j)-P(t_i+\delta)|]}{\alpha r}\right)^2} + f_{m-1}(\lfloor \delta/\tau \rfloor)(1-\zeta)^{t'_m-t'_{m-1}}$$

Moreover, since $\alpha \ll 1$, if $\|x(t'_m)-P(t_i)\| \geq r$, the follow occurs:

$$e^{-\left(\frac{[|x(t'_m)-P(t_i)|]}{\alpha r}\right)^2} \approx 0.$$

This is an important property of the likelihood function since the sum update can now performed only over the neighbors of $x(t'_j)$ and not the entire path. Denote by S the set of $(t_i, P(t_i))$ such that $\|x(t'_m)-P(t_i)\| \leq r$. The follow equation occurs:

$$f_m(\lfloor \delta/\tau \rfloor) = \sum_{(t_i,P(t_i)) \in S \wedge \lfloor (t'_m-t_i)/\tau \rfloor = \lfloor \delta/\tau \rfloor} e^{-\left(\frac{[|x(t'_m)-P(t_i)|]}{\alpha r}\right)^2} + f_{m-1}(\delta)(1-\zeta)^{t'_m-t'_{m-1}}$$

This is described in Algorithm 2.2 below. The term f is used as a sparse vector that receives also negative integer indices. The set S is the set of all neighbors of x(ti) on the path and can be computed quickly using the PPLEB algorithm. It is easy to verify that if the number of neighbors of x(ti) is bounded by some constant $n_{near}$ then the number of non-zeros in the vector f is bounded by $n_{near}/\zeta$ which is only a constant factor larger. The final stage of the algorithm is to output a specific value of $\delta$ if $f(\lfloor \delta/\tau \rfloor)$ is above some threshold value.

---

Algorithm 2 Efficient likelihood update.

1: f ← 0
2: while (t'$_j$, x(t'$_j$)) ∈ INPUT do
3:     f ← (1 − ζ)$^{t'_j t'_j-1}$f
4:     S ← {(t$_i$, P(t$_i$)) | ||x(t'$_j$) − P(t$_i$)|| ≤ r}
5:     for (t$_i$, P(t$_i$)) ∈ S do
6:        δ ← t'$_j$ − t$_i$ 7: $$f(\lfloor \delta/\tau \rfloor) \leftarrow f(\lfloor \delta/\tau \rfloor) + e^{-\frac{(\|x(t_j)-P(t')\|)^2}{\alpha r}}$$

---

Algorithm 2 Efficient likelihood update.

8:     end for
9: Set all f values below threshold ε to zero.
10: end while

---

Figure 10:
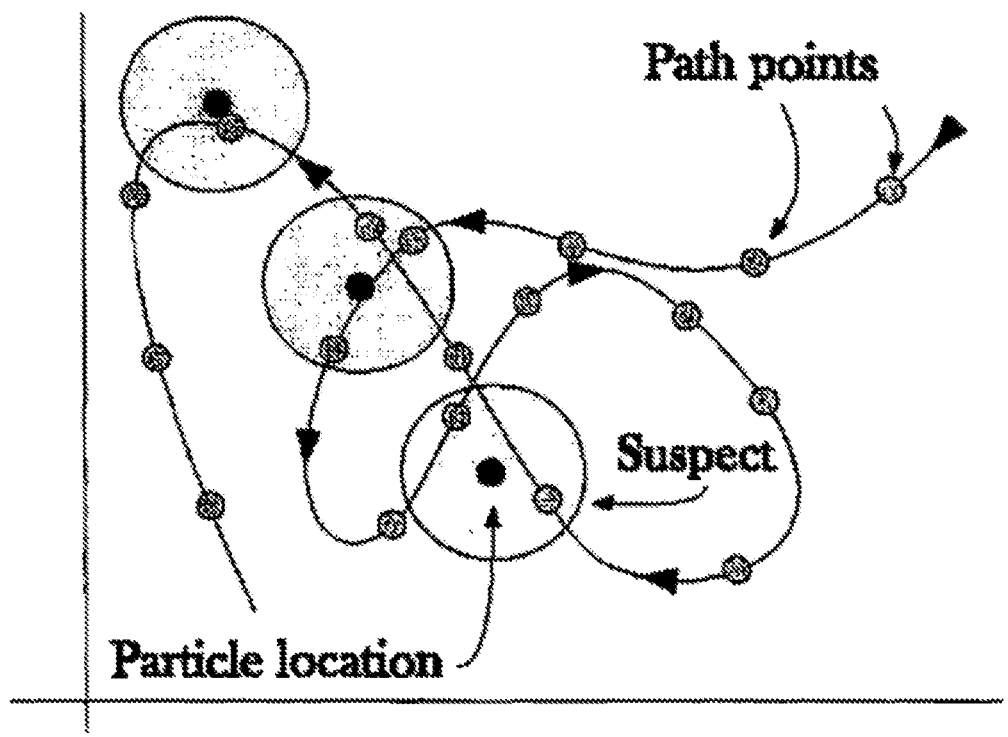
FIG. 10 is a chart illustrating point locations and the path points around them.

FIG. 10 gives three consecutive point locations and the path points around them. Note that neither the bottom point nor middle one alone would have been sufficient to identify the correct part of the path. Together, however, they are. Adding the top point increases the certainty that the particle is indeed of the final (left) curve of the path.

Figure 11:
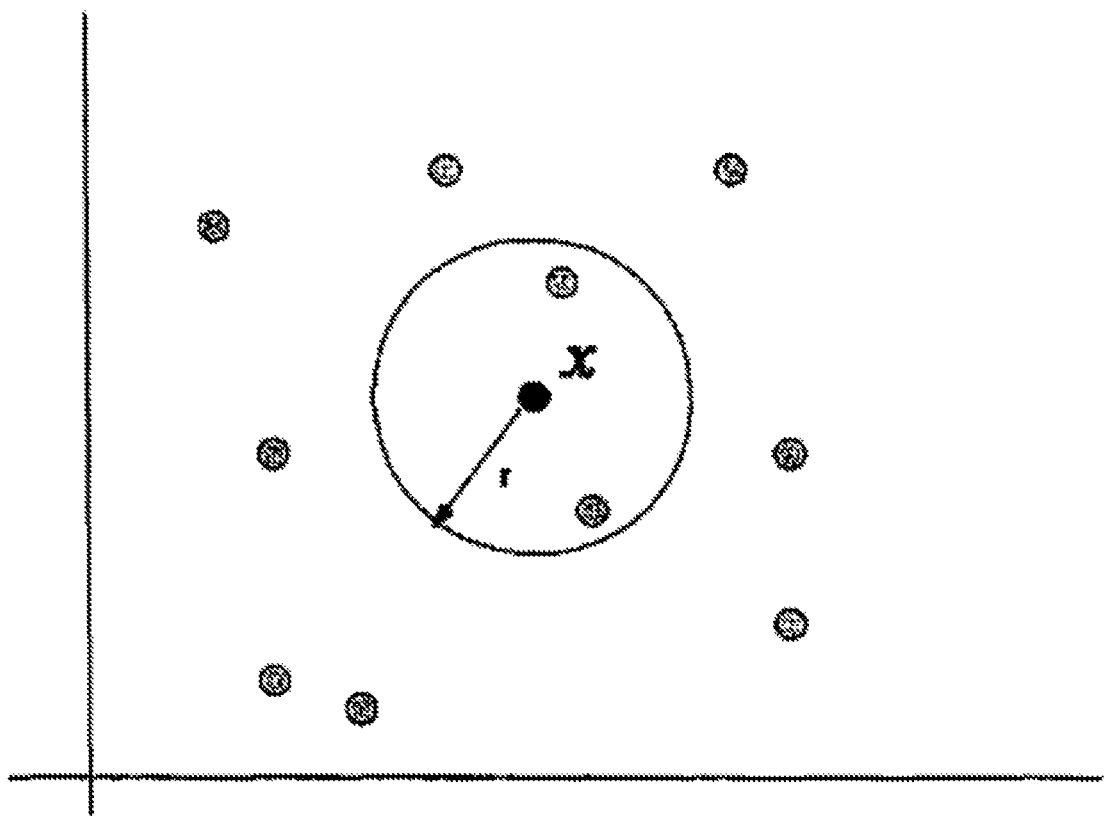
FIG. 11 is a chart illustrating a set of points that lie within distance from a query point.

In FIG. 11, given a set of n (grey) points, the algorithm is given a query point (black) and returns the set of points that lie within distance r from it (the points inside the circle). In the traditional setting, the algorithm must return all such points. In the probabilistic setting each such point should be returned only with some constant probability.

Figure 12:
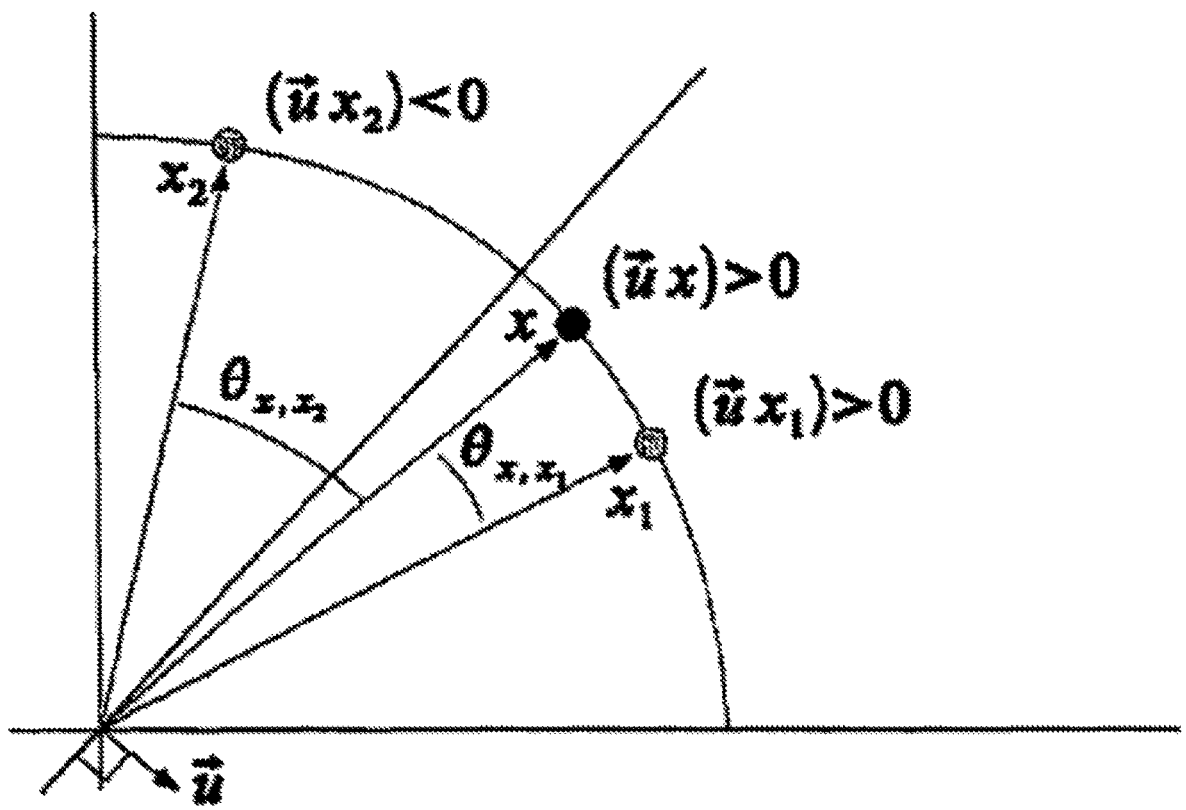
FIG. 12 is a chart illustrating possible point values.

FIG. 12 illustrates the values of $u(x_i)$, $u(x_2)$, and $u(x)$. Intuitively, the function u gives different values to $x_i$ and $x_2$ if the dashed line passes between them and the same value otherwise. Passing the dashed line in a random direction ensures that the probability of this happening is directly proportional to angle between $x_1$ and $x_2$.

FIG. 13 shows that by dividing the space into rings such that ring $R_i$ is between radius $2r(1+\epsilon)^i$ and $2r(1+\epsilon)^{i+1}$, it can be made sure that any two vectors within a ring are the same length up to $(1+\epsilon)$ factors and that any search is performed in at most $1/\epsilon$ rings.

FIG. 14 shows a self-intersecting paths and a query point (in black). It illustrates that without the history of the particle positions it is impossible to know where it is on the path.

Figure 15:
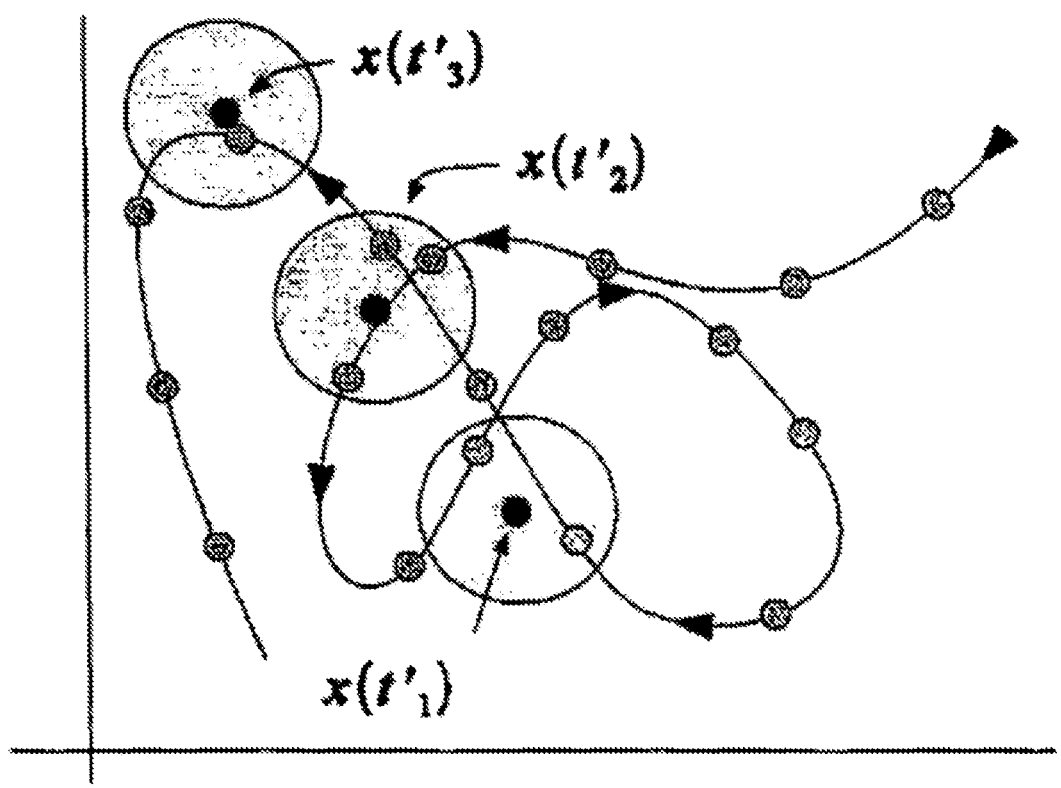
FIG. 15 is a chart illustrating three consecutive point locations and the path points around them.

FIG. 15 gives three consecutive point locations and the path points around them. Note that neither $x(t_i)$ nor $x(t_2)$ alone would have been sufficient to identify the correct part of the path. Together however they are. Adding $x(t_3)$ increases the certainty that the particle is indeed of the final (left) curve of the path.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of this disclosure are described with reference to specific examples thereof, but those skilled in the art will recognize that this disclosure is not limited thereto. Various features and aspects of the above disclosure may be used individually or jointly. Further, examples can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods.

These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
receiving initial cue data, wherein the initial cue data includes a plurality of initial pixel data samples associated with first pixel data of an initial frame; and
receiving updated new cue data, the updated new cue data including new cue data determined from a new frame including second pixel data that is different from the first pixel data, the new cue data including a plurality of new pixel data samples associated with the second pixel data of the new frame, wherein a pixel value difference between at least one initial pixel data sample from the initial frame and at least one new pixel data sample from the new cue data is within a pixel value range, and wherein the new cue data is updated to generate the updated new cue data by removing the at least one new pixel data sample from the new cue data in response to the pixel value difference being within the pixel value range.

2. The computer-implemented method of claim 1, further comprising:
receiving a flag indicating that the at least one new pixel data sample is removed from the new cue data.

3. The computer-implemented method of claim 1, further comprising:
receiving a flag indicating that a row of pixel data samples are removed from the new cue data, wherein the at least one new pixel data sample is included in the row.

4. The computer-implemented method of claim 1, wherein a pixel data sample is computed from a pixel patch, and wherein the pixel patch includes an array of pixels of a frame.

5. The computer-implemented method of claim 4, wherein the pixel data sample is computed by taking an average of pixel values of pixels in the pixel patch.

6. The computer-implemented method of claim 1, further comprising:
identifying that the at least one new pixel data sample is removed from the new cue data.

7. The computer-implemented method of claim 6, further comprising using a flag to identify the at least one new pixel data sample.

8. A system comprising:
one or more processors; and
a non-transitory computer-readable medium containing instructions that, when executed by the one or more processors, cause the one or more processors to perform operations including:
receiving initial cue data, wherein the initial cue data includes a plurality of initial pixel data samples associated with first pixel data of an initial frame; and
receiving updated new cue data, the updated new cue data including new cue data determined from a new frame including second pixel data that is different from the first pixel data, the new cue data including a plurality of new pixel data samples associated with the second pixel data of the new frame, wherein a pixel value difference between at least one initial pixel data sample from the initial frame and at least one new pixel data sample from the new cue data is within a pixel value range, and wherein the new cue data is updated to generate the updated new cue data by removing the at least one new pixel data sample from the new cue data in response to the pixel value difference being within the pixel value range.

9. The system of claim 8, further comprising:
receiving a flag indicating that the at least one new pixel data sample is removed from the new cue data.

10. The system of claim 8, further comprising:
receiving a flag indicating that a row of pixel data samples are removed from the new cue data, wherein the at least one new pixel data sample is included in the row.

11. The system of claim 8, wherein a pixel data sample is computed from a pixel patch, and wherein the pixel patch includes an array of pixels of a frame.

12. The system of claim 11, wherein the pixel data sample is computed by taking an average of pixel values of pixels in the pixel patch.

13. The system of claim 8, further comprising:
identifying that the at least one new pixel data sample is removed from the new cue data.

14. The system of claim 13, further comprising using a flag to identify the at least one new pixel data sample.

15. A computer-program product tangibly embodied in a non-transitory machine-readable storage medium, including instructions that, when executed by one or more processors, cause the one or more processors to:
receive initial cue data, wherein the initial cue data includes a plurality of initial pixel data samples associated with first pixel data of an initial frame; and
receive updated new cue data, the updated new cue data including new cue data determined from a new frame including second pixel data that is different from the first pixel data, the new cue data including a plurality of new pixel data samples associated with the second pixel data of the new frame, wherein a pixel value difference between at least one initial pixel data sample from the initial frame and at least one new pixel data sample from the new cue data is within a pixel value range, and wherein the new cue data is updated to generate the updated new cue data by removing the at least one new pixel data sample from the new cue data in response to the pixel value difference being within the pixel value range.

16. The computer-program product of claim 15, further comprising:
receiving a flag indicating that the at least one new pixel data sample is removed from the new cue data.

17. The computer-program product of claim 15, further comprising:

receiving a flag indicating that a row of pixel data samples are removed from the new cue data, wherein the at least one new pixel data sample is included in the row.

18. The computer-program product of claim 15, wherein a pixel data sample is computed from a pixel patch, and wherein the pixel patch includes an array of pixels of a frame.

19. The computer-program product of claim 18, wherein the pixel data sample is computed by taking an average of pixel values of pixels in the pixel patch.

20. The computer-program product of claim 15, further comprising:

identifying that the at least one new pixel data sample is removed from the new cue data.

\* \* \* \* \*